US012776670B2

(12) United States Patent
Liu et al.

(10) Patent No.: US 12,776,670 B2
(45) Date of Patent: Oct. 27, 2026

(54) COIL ALIGNMENT METHOD AND CHARGING SYSTEM

(71) Applicant: HONOR DEVICE CO., LTD., Shenzhen (CN)

(72) Inventors: Jian Liu, Shenzhen (CN); Haibin Zhou, Shenzhen (CN); Chen Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 980 days.

(21) Appl. No.: 17/797,236

(22) PCT Filed: Feb. 9, 2022

(86) PCT No.: PCT/CN2022/075713

§ 371 (c)(1),
(2) Date: Aug. 3, 2022

(87) PCT Pub. No.: WO2022/206178

PCT Pub. Date: Oct. 6, 2022

(65) Prior Publication Data

US 2024/0178708 A1 May 30, 2024

(30) Foreign Application Priority Data

Apr. 2, 2021 (CN) ........................ 202110363711.5

(51) Int. Cl.
*H02J 50/90* (2016.01)
*H02J 7/42* (2026.01)
(Continued)

(52) U.S. Cl.
CPC ................ *H02J 50/90* (2016.02); *H02J 7/42* (2026.01); *H02J 50/10* (2016.02); *H02J 50/402* (2020.01); *H02J 50/80* (2016.02)

(58) Field of Classification Search
CPC ...................................................... H02J 50/90
(Continued)

(56) References Cited

U.S. PATENT DOCUMENTS 11,264,824 B2 3/2022 Ma
11,462,954 B2 10/2022 Sun
(Continued)

FOREIGN PATENT DOCUMENTS

CN 208522514 U 2/2019
CN 109435715 A 3/2019
(Continued)

*Primary Examiner* — Ahmed H Omar
(74) *Attorney, Agent, or Firm* — WOMBLE BOND DICKINSON (US) LLP

(57) ABSTRACT

Embodiments of this application provide a coil alignment method and a charging system. The method includes: obtaining, by an electronic device, coil adjustment information after the electronic device establishes communication with a charging device, the coil adjustment information including: at least one of coil offset information or bottom plate rotation information, the coil offset information being offset information of a first transmitting coil relative to a first receiving coil, and the bottom plate rotation information being rotation information of a bottom plate on the charging device relative to the electronic device; and sending, by the electronic device, a control instruction to the charging device, the control instruction carrying the coil adjustment information, so that the charging device adjusts the transmitting coil on the charging device according to the control instruction, to align the transmitting coil with the receiving coil in a longitudinal direction, thereby improving the charging efficiency.

19 Claims, 16 Drawing Sheets

(51) Int. Cl.

| | |
|---|---|
| ***H02J 50/10*** | (2016.01) |
| ***H02J 50/40*** | (2016.01) |
| ***H02J 50/80*** | (2016.01) |

(58) Field of Classification Search

USPC .......................................................... 320/108

See application file for complete search history.

(56) References Cited

U.S. PATENT DOCUMENTS

| | | | | |
|---|---|---|---|---|
| 2009/0079269 | A1 | 3/2009 | Jin | |
| 2010/0156347 | A1* | 6/2010 | Lee | H02J 50/90 320/108 |
| 2013/0088193 | A1* | 4/2013 | Chen | H02J 7/0044 320/108 |
| 2016/0052415 | A1* | 2/2016 | Bell | H02J 50/80 320/108 |
| 2020/0343777 | A1* | 10/2020 | Jia | H02J 50/12 |
| 2020/0412181 | A1* | 12/2020 | Sun | H02J 50/80 |

FOREIGN PATENT DOCUMENTS

| | | | |
|---|---|---|---|
| CN | 208738903 | U * | 4/2019 |
| CN | 110611378 | A | 12/2019 |
| CN | 111030326 | A | 4/2020 |
| CN | 111756119 | A | 10/2020 |
| CN | 111884360 | A | 11/2020 |
| CN | 112152325 | A | 12/2020 |
| CN | 113162255 | A | 7/2021 |
| EP | 3758191 | A2 | 12/2020 |
| WO | 2019209043 | A1 | 10/2019 |

* cited by examiner

COIL ALIGNMENT METHOD AND CHARGING SYSTEM

This application is a National Stage of International Application No. PCT/CN2022/075713, filed Feb. 9, 2022, which claims priority to Chinese Patent Application No. 202110363711.5, filed Apr. 2, 2021, both of which are hereby incorporated by reference in their entireties.

TECHNICAL FIELD

Embodiments of this application relate to the field of wireless charging, and in particular, to a coil alignment method and a charging system.

BACKGROUND

With the development of wireless charging technologies, a growing number of electronic devices have a wireless charging function. To charge an electronic device, a user may directly place the electronic device on a charging device. Compared with conventional charging technologies that require the user to insert the charging cable into the electronic device, the wireless charging technology simplifies the operations required for the user to charge the electronic device and improves user experience.

A transmitting coil is arranged on the charging device, and a receiving coil is arranged on the electronic device. When an offset between a center point of the transmitting coil and a center point of the receiving coil is less than a specific value, the receiving coil can receive magnetic field energy sent by the transmitting coil, that is, charging can be implemented. Maximum charging efficiency is achieved when the center point of the transmitting coil is aligned with the center point of the receiving coil. Generally, the size of the electronic device is greater than that of the charging device. When the user normally places the electronic device on the charging device, the offset between the center point of the transmitting coil and the center point of the receiving coil is not large in the horizontal direction. However, due to the coil design, the offset between the center point of the transmitting coil and the center point of the receiving coil is relatively large in the longitudinal direction, affecting the charging efficiency.

SUMMARY

Embodiments of this application provide a coil alignment method and a charging system, to implement alignment of a transmitting coil with a receiving coil in a longitudinal direction, thereby improving the charging efficiency.

According to a first aspect, an embodiment of this application provides a coil alignment method, applicable to an electronic device. The electronic device is configured to be capable of performing wireless charging with a charging device. The electronic device includes at least one receiving coil. The charging device includes at least one transmitting coil and a bottom plate, and the at least one transmitting coil is fixed to the bottom plate. The method includes: obtaining, by the electronic device, coil adjustment information after the electronic device establishes communication with the charging device, the coil adjustment information including: at least one of coil offset information or bottom plate rotation information, the coil offset information being offset information of a first transmitting coil relative to a first receiving coil, the first transmitting coil being a transmitting coil that establishes communication with the electronic device on the charging device, the first receiving coil being a receiving coil that communicates with the first transmitting coil, and the bottom plate rotation information being rotation information of the bottom plate relative to the electronic device: and sending, by the electronic device, a control instruction to the charging device, the control instruction carrying the coil adjustment information, so that the charging device adjusts the transmitting coil on the charging device according to the control instruction.

In a possible implementation, the coil adjustment information includes the coil offset information, and the obtaining, by the electronic device, coil adjustment information includes: obtaining, by the electronic device, a coil identifier of a coil that establishes communication with the electronic device on the charging device: determining, by the electronic device, the first transmitting coil according to the coil identifier: and determining, by the electronic device, the coil offset information according to the first transmitting coil.

In a possible implementation, the determining, by the electronic device, the coil offset information according to the first transmitting coil includes: obtaining, by the electronic device, a first distance, the first distance being a distance from a center point of the first transmitting coil to a preset limiting edge: obtaining, by the electronic device, a second distance, the second distance being a distance from a center point of the first receiving coil to the preset limiting edge: and determining, by the electronic device, the coil offset information according to the first distance and the second distance.

In a possible implementation, the determining, by the electronic device, the coil offset information according to the first distance and the second distance includes: obtaining, by the electronic device, a result of a subtraction operation performed on the first distance and the second distance: determining, by the electronic device, an offset direction of the first transmitting coil relative to the first receiving coil depending on whether the result of the subtraction operation is a positive or negative value: and determining, by the electronic device, an offset distance of the first transmitting coil relative to the first receiving coil according to a value of the result of the subtraction operation, the coil offset information including the offset direction and the offset distance.

In a possible implementation, the obtaining, by the electronic device, a second distance includes: obtaining, by the electronic device, a placement posture of the electronic device; and determining, by the electronic device, the second distance according to the placement posture.

In a possible implementation, the determining, by the electronic device, the second distance according to the placement posture includes: using, if the placement posture is vertical placement with a first side facing upward, a distance from the center point of the first receiving coil to a second side as the second distance: using, if the placement posture is vertical placement with the second side facing upward, a distance from the center point of the first receiving coil to the first side as the second distance: using, if the placement posture is horizontal placement with a third side facing upward, a distance from the center point of the first receiving coil to a fourth side as the second distance: or using, if the placement posture is horizontal placement with the fourth side facing upward, a distance from the center point of the first receiving coil to the third side as the second distance.

the first side being a side at which an earpiece hole is located, the second side being a side opposite to the first side, the third side being a side at which a power key is located, and the fourth side being a side opposite to the third side.

In a possible implementation, the first transmitting coil includes an upper coil and a lower coil, the first receiving coil includes an upper coil and a lower coil, the coil adjustment information includes the coil offset information, and the obtaining, by the electronic device, coil adjustment information includes: obtaining, by the electronic device, the placement posture of the electronic device: obtaining, if the placement posture is vertical placement with the first side facing upward, offset information of an upper coil on the charging device relative to an upper coil on the electronic device and offset information of a lower coil on the charging device relative to a lower coil on the electronic device: or obtaining, if the placement posture is vertical placement with the second side facing upward, offset information of the upper coil on the charging device relative to the lower coil on the electronic device and offset information of the lower coil on the charging device relative to the upper coil on the electronic device.

In a possible implementation, the at least one transmitting coil includes an upper coil and a lower coil, the at least one receiving coil includes an upper coil and a lower coil, the first transmitting coil is a lower coil, the coil adjustment information includes the bottom plate rotation information, and the obtaining, by the electronic device, coil adjustment information includes: obtaining, by the electronic device, the placement posture of the electronic device: and determining, by the electronic device, the bottom plate rotation information according to the placement posture of the electronic device and the first receiving coil.

In a possible implementation, the determining, by the electronic device, the bottom plate rotation information according to the placement posture of the electronic device and the first receiving coil includes determining a bottom plate rotation direction as clockwise if the first receiving coil is an upper coil on the electronic device, and the placement posture is horizontal placement with the third side facing upward: determining the bottom plate rotation direction as counterclockwise if the first receiving coil is the upper coil on the electronic device, and the placement posture is horizontal placement with the fourth side facing upward: determining the bottom plate rotation direction as counterclockwise if the first receiving coil is a lower coil on the electronic device, and the placement posture is horizontal placement with the third side facing upward: or determining the bottom plate rotation direction as clockwise if the first receiving coil is the lower coil on the electronic device, and the placement posture is horizontal placement with the fourth side facing upward, the bottom plate rotation information including the bottom plate rotation direction.

In a possible implementation, the obtaining, by the electronic device, coil adjustment information includes: obtaining, by the electronic device, a model of the charging device; determining, by the electronic device according to the model, whether the charging device supports coil movement and coil rotation: obtaining the coil offset information if the charging device supports only the coil movement: obtaining the bottom plate rotation information if the charging device supports only the coil rotation: or obtaining the coil offset information and the bottom plate rotation information if the charging device supports the coil movement and the coil rotation.

According to a second aspect, an embodiment of this application provides a coil alignment method, applicable to a charging device. The charging device is configured to be capable of performing wireless charging with an electronic device. The electronic device includes at least one receiving coil. The charging device includes at least one transmitting coil and a bottom plate, and the at least one transmitting coil is fixed to the bottom plate. The method includes: sending, by the charging device, device information to the electronic device after the charging device establishes communication with the electronic device, the device information being used by the electronic device to obtain coil adjustment information according to the device information, the coil adjustment information including: at least one of coil offset information or bottom plate rotation information, the coil offset information being offset information of a first transmitting coil relative to a first receiving coil, the first transmitting coil being a transmitting coil that establishes communication with the electronic device on the charging device, the first receiving coil being a receiving coil that communicates with the first transmitting coil, and the bottom plate rotation information being rotation information of the bottom plate relative to the electronic device; receiving, by the charging device, a control instruction sent by the electronic device, the control instruction carrying the coil adjustment information: and adjusting, by the charging device, the transmitting coil on the charging device according to the control instruction.

In a possible implementation, the device information includes a coil identifier of a coil that establishes communication with the electronic device on the charging device, and the coil identifier is used by the electronic device to determine the first transmitting coil according to the coil identifier and determine the coil offset information according to the first transmitting coil.

In a possible implementation, the device information further includes a model of the charging device, and the model is used by the electronic device to determine, according to the model, whether the charging device supports coil movement and coil rotation, where if the charging device supports only the coil movement, the electronic device obtains the coil offset information: if the charging device supports only the coil rotation, the electronic device obtains the bottom plate rotation information: or if the charging device supports the coil movement and the coil rotation, the electronic device obtains the coil offset information and the bottom plate rotation information.

According to a third aspect, an embodiment of this application provides an electronic device, including: at least one receiving coil, a memory, and a processor. The receiving coil is configured to receive magnetic field energy transmitted by a transmitting coil on a charging device. The memory is configured to store executable instructions, the executable instructions, when executed by the processor, causing the electronic device to implement the method provided in the first aspect.

According to a fourth aspect, an embodiment of this application provides a charging device, including: at least one transmitting coil, a bottom plate, a memory, and a processor. The at least one transmitting coil is fixed to the bottom plate. The transmitting coil is configured to transmit magnetic field energy. The memory is configured to store executable instructions, the executable instructions, when executed by the processor, causing the charging device to implement the method provided in the second aspect.

In a possible implementation, the charging device in the fourth aspect further includes: a first driving component. The first driving component is configured to drive the bottom plate to move. The processor is configured to control, according to the control instruction, the first driving component to work, to move the bottom plate under the action of the first driving component.

In a possible implementation, the first driving component includes: a first motor, a first gear, and a movable component engaged with the first gear. The first gear is mounted on the first motor. The movable component is fixed to the bottom plate. The first gear is configured to rotate under the action of the first motor, and the movable component is configured to move under the drive of the first gear, to move the bottom plate.

In a possible implementation, the charging device in the fourth aspect further includes: a second driving component. The second driving component includes: a second motor and a second gear. The second gear is fixed to the bottom plate, and the second gear is configured to rotate under the action of the second motor, to rotate the bottom plate.

According to the coil alignment method and the charging system provided in the embodiments of this application, a transmitting coil can be aligned with a receiving coil in a longitudinal direction, to improve the charging efficiency.

DESCRIPTION OF EMBODIMENTS

Figure 1:
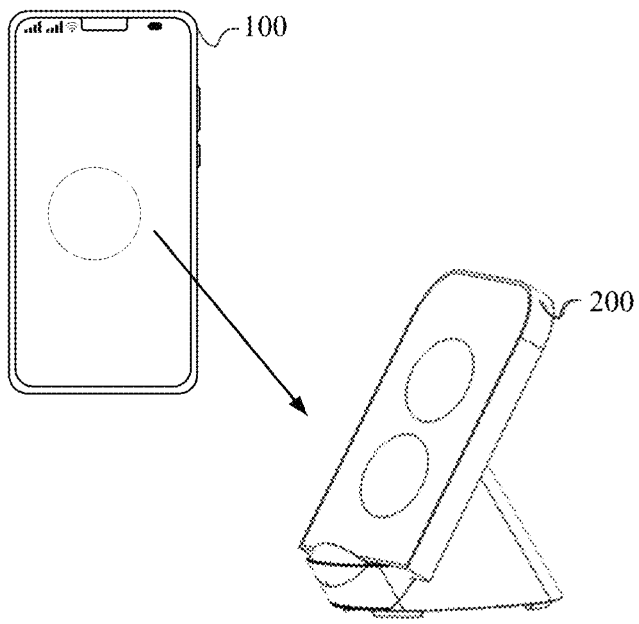
FIG. 1 is an application scenario diagram according to an embodiment of this application.

FIG. 1 is an application scenario diagram according to an embodiment of this application. An application scenario shown in FIG. 1 relates to a charging system. The charging system includes: an electronic device 100 and a charging device 200. A transmitting coil is arranged on the charging device 200, and a receiving coil is arranged on the electronic device 100. When a user places the electronic device 100 on the charging device 200, the transmitting coil is coupled to the receiving coil by using an electromagnetic field to implement wireless transmission of electric energy.

Figure 2:
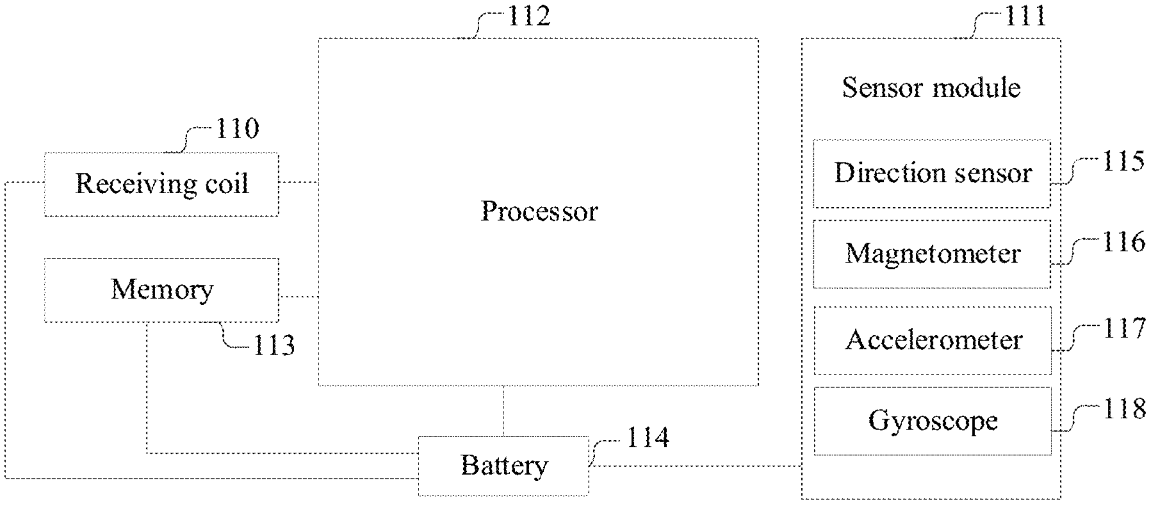
FIG. 2 is a schematic structural diagram of an electronic device 100 according to an embodiment of this application.

FIG. 2 is a schematic structural diagram of an electronic device 100 according to an embodiment of this application. As shown in FIG. 2, the electronic device 100 may include: a receiving coil 110, a sensor module 111, a processor 112, a memory 113, and a battery 114. The sensor module 111 may include: a direction sensor 115, a magnetometer 116, an accelerometer 117, and a gyroscope 118.

The receiving coil 110 is configured to receive magnetic field energy transmitted by the transmitting coil on the charging device 200 and convert the magnetic field energy into electric energy; to charge the battery 114. The receiving coil 110 is further configured to send an instruction to the charging device 200 or receive an instruction sent by the charging device 200, so that the transmitting coil on the charging device 200 can move and/or rotate, to align a center point of the transmitting coil with a center point of the receiving coil 110, thereby improving the charging efficiency of the charging device 200. The instruction may be transmitted through coupling between the receiving coil 110 and the transmitting coil.

It should be noted that the electronic device 100 shown in FIG. 2 includes only one receiving coil 110, which is merely an example. In another embodiment, the electronic device 100 may include two or more receiving coils 110. The structure shown in FIG. 2 does not constitute a limitation on this embodiment of this application.

The direction sensor 115, the magnetometer 116, the accelerometer 117, and the gyroscope 118 are configured to send measured values to a processor 112, so that the processor 112 determines a placement posture of the electronic device 100 according to the measured values of the direction sensor 115, the magnetometer 116, the accelerometer 117, and the gyroscope 118. It may be understood that FIG. 2 is merely an example, and the placement posture of the electronic device 100 may alternatively be determined by using another component. This is not limited in this embodiment of this application.

The processor 112 may include one or more processing units. For example, the processor 112 may include an application processor (application processor. AP), a modem processor, a graphics processing unit (graphics processing unit. GPU), an image signal processor (image signal processor. ISP), a controller, a video codec, a digital signal processor (digital signal processor, DSP), a baseband processor, a display process unit (display process unit, DPU), and/or a neural-network processing unit (neural-network processing unit, NPU). Different processing units may be independent components, or may be integrated into one or more processors. In some embodiments, the electronic device 100 may also include one or more processors 112. The controller may be a nerve center and a command center of the electronic device 100. The controller may generate an operation control signal based on an instruction operation code and a timing signal, to implement control of fetching an instruction and executing the instruction. In this embodiment of this application, both processing and calculation processes may be performed by the processor 112. For example, the processor 112 may be configured to obtain offset information of the transmitting coil relative to the receiving coil 110 and/or a bottom plate rotation direction and transmit an instruction to the charging device 200 by using the receiving coil 110, the instruction carrying the offset information and/or the bottom plate rotation direction. Therefore, the charging device 200 can control the transmitting coil to move according to the offset information and control the bottom plate to rotate according to the bottom plate rotation direction, to align the center point of the transmitting coil with the center point of the receiving coil 110.

The memory 113 may be configured to store one or more computer programs, the one or more computer programs including instructions. The processor 110 may run the instructions stored in the memory 113, to cause the electronic device 100 to perform various function applications, data processing, or the like. The memory 113 may include a high-speed random access memory, or may include a non-volatile memory such as at least one magnetic disk memory, a flash memory, or a universal flash storage (universal flash storage, UFS). A coil alignment method provided in an embodiment of this application may be one or more computer programs, and the one or more computer programs may be stored in the memory 113.

The battery 114 is configured to supply power to various components in the electronic device 100.

It may be understood that the structure shown in FIG. 2 does not constitute a specific limitation on the electronic device 100. In some other embodiments, the electronic device 100 may include more or fewer components than those shown in FIG. 2, or some components may be combined, or some components may be split, or components are arranged in different manners. The components shown in FIG. 2 may be implemented by hardware, software, or a combination of software and hardware.

It should be noted that in the accompanying drawing of the embodiments of this application, an example in which the electronic device 100 is a mobile phone is used for illustration. In another embodiment, the electronic device 100 may further be a tablet computer, a notebook computer, or a wearable device. The wearable device may be a smart watch, a smart bracelet, a headset, a virtual reality (virtual reality. VR) device, an augmented reality (augmented reality. AR) device, or the like. This is not limited in this embodiment of this application.

Figure 3A:
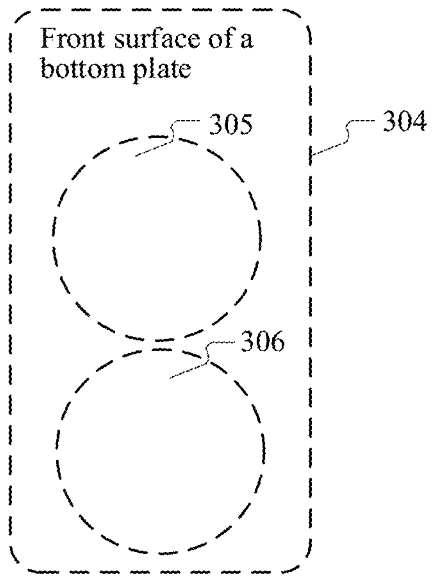
FIG. 3A is a schematic diagram of a front surface of a charging device 200 according to an embodiment of this application.
Figure 3B:
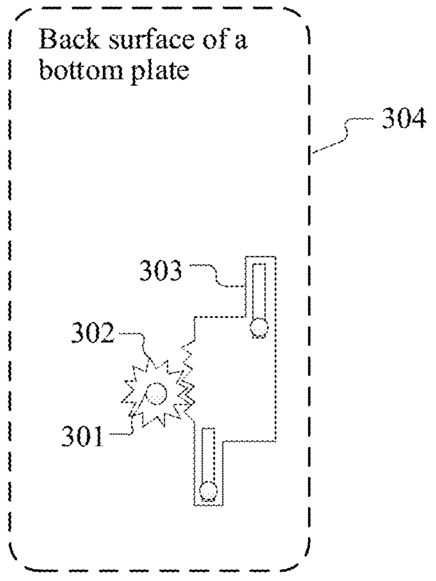
FIG. 3B is a schematic diagram of a back surface of a charging device 200 according to an embodiment of this application.
Figure 3C:
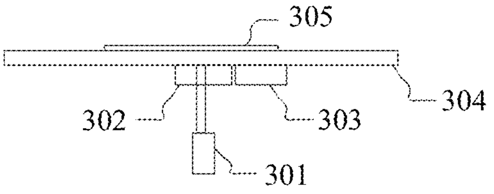
FIG. 3C is a top view of a charging device 200 according to an embodiment of this application.

FIG. 3A to FIG. 3C are partial schematic structural diagrams of a charging device 200 according to an embodiment of this application. The charging device 200 supports coil movement. The charging device 200 includes: a first driving component, a bottom plate 304, two transmitting coils (including an upper coil 305 and a lower coil 306), and a processor (not shown). The first driving component includes a motor 301, a gear 302, and a movable component 303 engaged with the gear 302. Referring to FIG. 3A, the upper coil 305 and the lower coil 306 are fixed to a front surface of the bottom plate 304. Referring to FIG. 3B, the movable component 303 is fixed to a back surface of the bottom plate 304. Referring to FIG. 3C. FIG. 3C is a top view of FIG. 3B or FIG. 3A. The motor 301 is inserted into the gear 302, and the gear 302 may rotate under the action of the motor 301.

It should be noted that to describe the principle of implementing upward and downward movement of the bottom plate by using the gear 302 and the movable component 303. FIG. 3B is used for illustration in this embodiment of this application. However, it should be noted that the gear 302 is not fixed to the bottom plate 304 but is mounted on the motor 301 as shown in FIG. 3C. The gear 302 may rotate under the action of the motor 301, and the rotation of the gear 302 may drive the movable component 303 to move upward or downward. Because the movable component 303 is fixed to the back surface of the bottom plate 304, the movable component 303 may drive the bottom plate 304 to move upward when moving upward, and the movable component 303 may drive the bottom plate 304 to move downward when moving downward.

The upper coil 305 and the lower coil 306 are configured to transmit magnetic field energy and further configured to send an instruction to the electronic device 100 or receive an instruction sent by the electronic device 100. The processor may control the motor 301 to work according to the instructions received by the upper coil 305 and the lower coil 306, to rotate the gear 302, so as to move the bottom plate 304 upward or downward.

Figure 4:
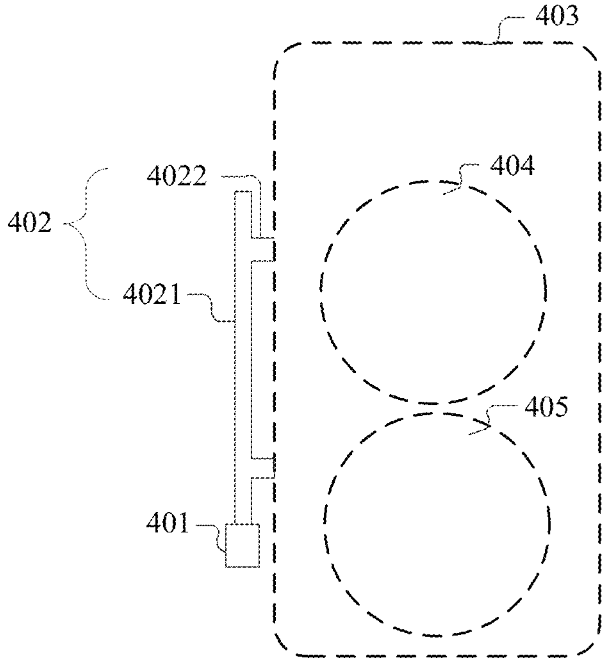
FIG. 4 is a schematic diagram of another charging device 200 according to an embodiment of this application.

FIG. 4 is a partial schematic diagram of another charging device 200 according to an embodiment of this application. The charging device 200 also supports the coil movement. The charging device 200 includes: a first driving component, a bottom plate 403, two transmitting coils (including an upper coil 404 and a lower coil 405), and a processor (not shown). The first driving component includes a motor 401 and a lifting apparatus 402. Both the upper coil 404 and the lower coil 405 are fixed to the bottom plate 403. The lifting apparatus 402 includes: a threaded guide rail 4021 and at least one connector 4022. The threaded guide rail 4021 is in threaded connection with the at least one connector 4022. The at least one connector 4022 is fixedly connected to the bottom plate 403.

When one of two components that are in threaded connection rotates but does not move in an axial direction, the other component moves in the axial direction. Therefore, by using the principle, the motor 401 may control the threaded guide rail 4021 to rotate without moving upward and downward, so that the at least one connector 4022 in threaded connection with the threaded guide rail 4021 moves upward and downward. For example, the motor 401 may control the threaded guide rail 4021 to rotate clockwise without moving upward and downward. In this case, the at least one connector 4022 in threaded connection with the threaded guide rail 4021 moves downward. Because the at least one connector 4022 is fixedly connected to the bottom plate 403, the at least one connector 4022 drives the bottom plate 403 to move downward when moving downward. The clockwise corresponding to downward movement is merely an example. Alternatively: when the threaded guide rail 4021 rotates counterclockwise, the bottom plate 403 moves downward. This is not limited in this embodiment of this application.

The upper coil 404 and the lower coil 405 are configured to transmit magnetic field energy and further configured to send an instruction to the electronic device 100 or receive an instruction sent by the electronic device 100. The processor may control the motor 401 to work according to the instructions received by the upper coil 404 and the lower coil 405, to rotate the threaded guide rail 4021 without moving upward and downward. Under the action of the threaded guide rail 4021, the at least one connector 4022 moves upward or downward, thereby driving the bottom plate 403 to move upward or downward.

Figure 5A:
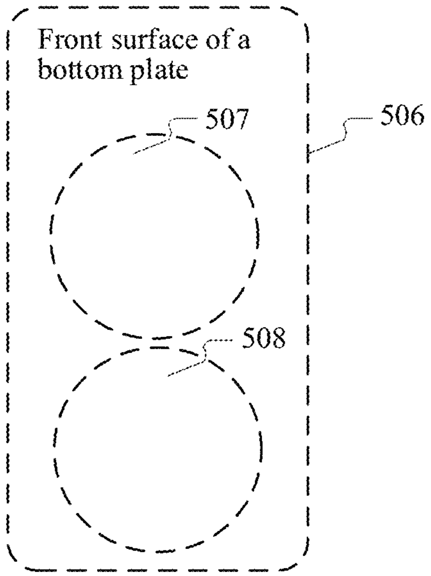
FIG. 5A is a schematic diagram of a front surface of another charging device 200 according to an embodiment of this application.
Figure 5B:
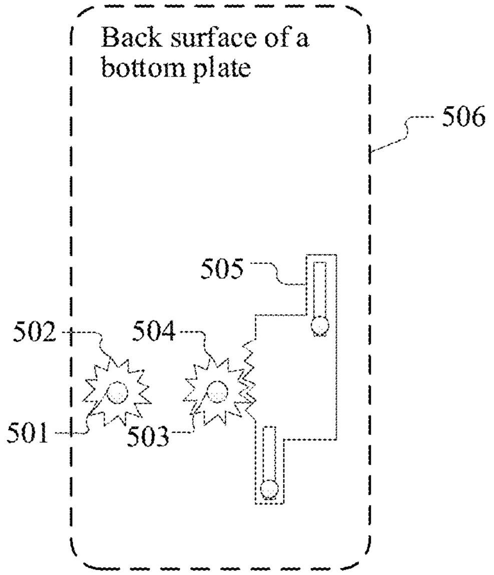
FIG. 5B is a schematic diagram of a back surface of another charging device 200 according to an embodiment of this application.
Figure 5C:
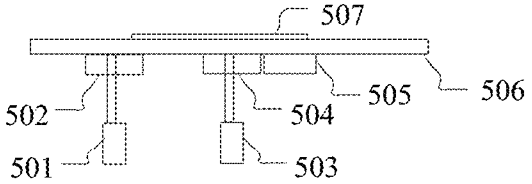
FIG. 5C is a top view of another charging device 200 according to an embodiment of this application.

FIG. 5A to FIG. 5C are partial schematic diagrams of another charging device 200 according to an embodiment of this application. The charging device 200 supports the coil movement and coil rotation. The charging device 200 includes: a first driving component, a second driving component, a bottom plate 506, two transmitting coils (including an upper coil 507 and a lower coil 508), and a processor (not shown). The first driving component includes a first motor 501 and a first gear 502. The second driving component includes a second motor 503, a second gear 504, and a movable component 505 engaged with the second gear 504. Referring to FIG. 5A, the upper coil 507 and the lower coil 508 are fixed to a front surface of the bottom plate 506. Referring to FIG. 5B, the movable component 505 and the second gear 502 are fixed to a back surface of the bottom plate 506. It should be noted that the second gear 504 is not fixed to the bottom plate 506 but is mounted on the second motor 503. Referring to FIG. 5C, FIG. 5C is a top view of FIG. 5B or FIG. 5A. The first motor 501 is inserted into the first gear 502, and the first gear 502 may rotate under the action of the first motor 501. The second motor 503 is inserted into the second gear 504, and the second gear 504 may rotate under the action of the second motor 503.

It should be noted that referring to FIG. 5B, the rotation of the second gear 504 may drive the movable component 505 to move upward or downward. Because the movable component 505 is fixed to the back surface of the bottom plate 506, the movable component 505 may drive the bottom plate 506 to move upward when moving upward, and the movable component 505 may drive the bottom plate 506 to move downward when moving downward. Because the first gear 502 is fixed to the back surface of the bottom plate 506, the rotation of the first gear 502 may drive the bottom plate 506 to rotate.

It should be noted that a solution that the first gear 502 drives the bottom plate 506 to rotate is merely an example. In another embodiment, another gear may be mounted on the first motor 501. The gear is engaged with the first gear 502, and the gear may rotate under the action of the first motor 501. Because the gear is engaged with the first gear 502, the rotation of the gear may drive the first gear 502 to rotate, so as to drive the bottom plate 506 to rotate.

The upper coil 507 and the lower coil 508 are configured to transmit magnetic field energy and further configured to send an instruction to the electronic device 100 or receive an instruction sent by the electronic device 100. The processor may control the first motor 501 to work according to the instructions received by the upper coil 507 and the lower coil 508, to rotate the first gear 502, so as to rotate the bottom plate 506. The processor may further control the second motor 503 to work according to the instructions received by the upper coil 507 and the lower coil 508, to rotate the second gear 504, so as to move the bottom plate 506.

It should be noted that in the structure shown in FIG. 3A to FIG. 3C, the structure shown in FIG. 4, and the structure shown in FIG. 5A to FIG. 5C, the upper coil and the lower coil are fixed to the same bottom plate. In this case, when the bottom plate moves, both the upper coil and the lower coil move. In another embodiment, a plurality of transmitting coils on the charging device 200 may be respectively fixed to different bottom plates. After receiving an instruction sent by the electronic device 100, the processor may control a plurality of bottom plates to move upward and downward independently, so that the movement of the plurality of transmitting coils does not affect each other.

The charging efficiency of the charging device 200 is related to a coil alignment condition. The coil alignment mentioned in this embodiment of this application refers to alignment of the transmitting coil on the charging device 200 with the receiving coil on the electronic device 100. When the center point of the transmitting coil on the charging device 200 is aligned with the center point of the receiving coil on the electronic device 100, the charging device 200 achieves the maximum charging efficiency. Generally, a size of the electronic device 100 is greater than that of the charging device 200. When a user normally places the electronic device 100 on the charging device 200, an offset between the center point of the transmitting coil and the center point of the receiving coil is not large in a horizontal direction. However, due to a coil design, an offset between the center point of the transmitting coil and the center point of the receiving coil is relatively large in a longitudinal direction, resulting in low charging efficiency of the charging device 200. Therefore, an embodiment of this application provides an alignment method in a longitudinal direction, and alignment mentioned in this embodiment of this application refers to alignment in the longitudinal direction.

Because when the user normally places the electronic device 100 on the charging device 200, the offset between the center point of the transmitting coil and the center point of the receiving coil is not large in the horizontal direction, in the accompanying drawings of the embodiments of this application, no offset is shown in the horizontal direction. However, it should be noted that even if there is a specific offset in the horizontal direction, alignment in the longitudinal direction may still be performed by using the method provided in this embodiment of this application.

It should be noted that in the charging system shown in FIG. 1, the electronic device 100 includes one receiving coil and the charging device 200 includes two transmitting coils, which are merely an example. In another embodiment, the electronic device 100 may include two or more receiving coils, and the charging device 200 may include one transmitting coil or two or more transmitting coils. FIG. 1 does not constitute a limitation on this embodiment of this application. That the electronic device 100 includes one receiving coil may be understood as that the electronic device 100 is a single coil, and that the electronic device 100 includes two receiving coils may be understood as that the electronic device 100 is a dual coil. That the charging device 200 includes one transmitting coil may be understood as that the charging device 200 is a single coil, and that the charging device 200 includes two transmitting coils may be understood as that the charging device 200 is a dual coil. The meaning of center point alignment mentioned in the foregoing is described below in conjunction with the following several scenarios. In the accompanying drawings of the embodiments of this application, the receiving coil is denoted by using a solid line and the transmitting coil is denoted by using a dashed line.

Figure 6:
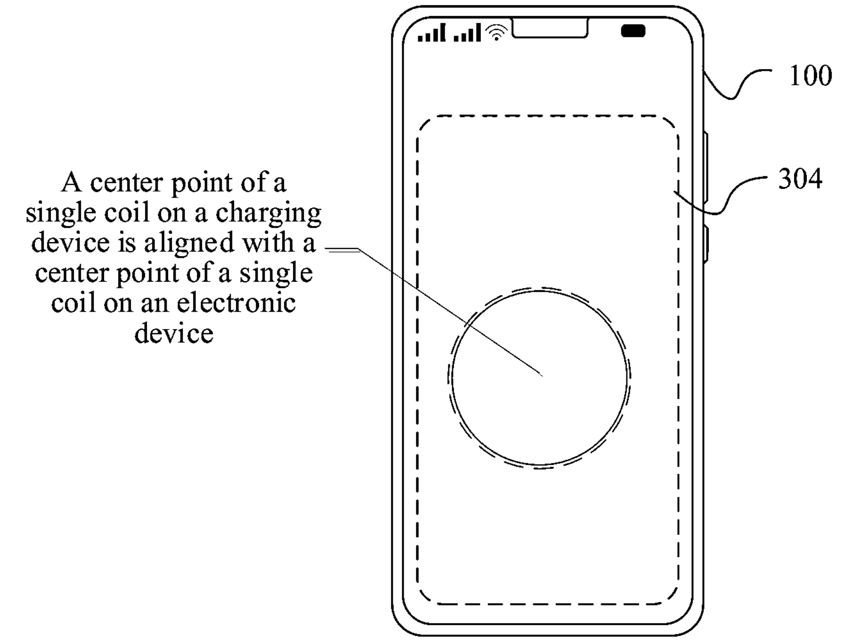
FIG. 6 is a schematic diagram of a first scenario according to an embodiment of this application.

In a first scenario, referring to FIG. 6, the electronic device 100 is a single coil and the charging device 200 is also a single coil. The center point alignment mentioned above refers to alignment of a center point of the single coil on the charging device 200 with a center point of the single coil on the electronic device 100.

Figure 7:
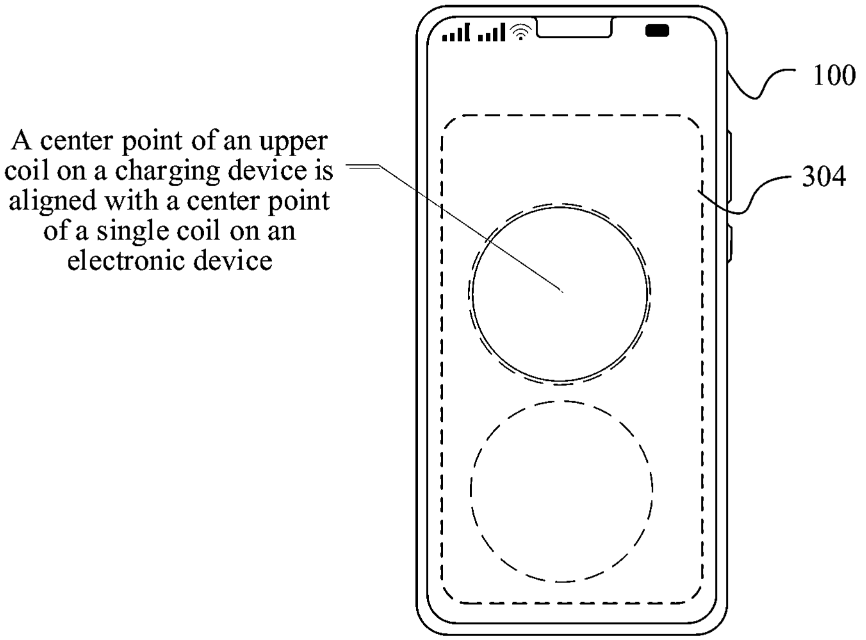
FIG. 7 is a schematic diagram of a second scenario according to an embodiment of this application.

In a second scenario, referring to FIG. 7, the electronic device 100 is a single coil and the charging device 200 is a dual coil. The center point alignment mentioned above refers to alignment of a center point of an upper coil on the charging device 200 with the center point of the single coil on the electronic device 100 (referring to FIG. 6) or alignment of a center point of a lower coil on the charging device 200 with the center point of the single coil on the electronic device 100.

Figure 8:
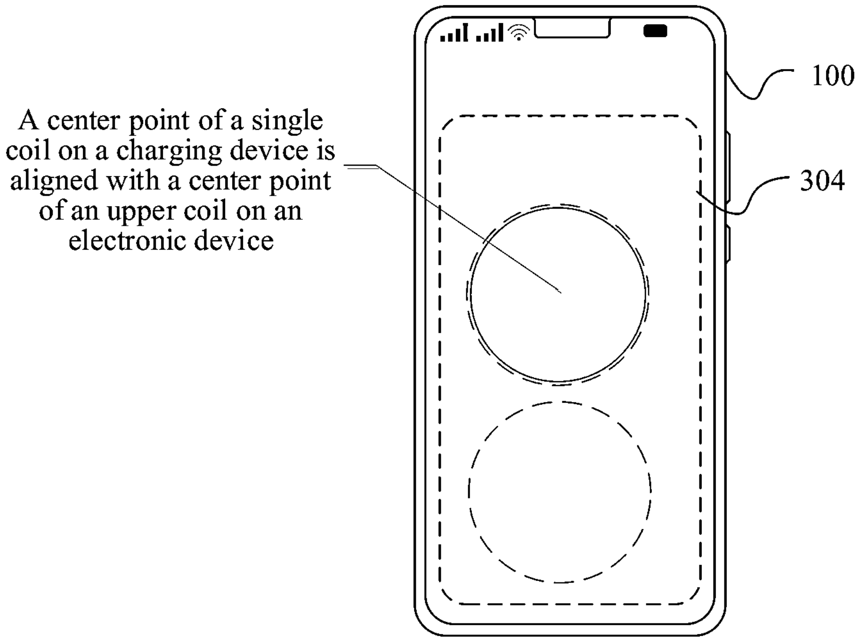
FIG. 8 is a schematic diagram of a third scenario according to an embodiment of this application.

In a third scenario, referring to FIG. 8, the electronic device 100 is a dual coil and the charging device 200 is a single coil. The center point alignment mentioned above refers to alignment of the center point of the single coil on the charging device 200 with a center point of an upper coil on the electronic device 100 (referring to FIG. 7) or alignment of the center point of the single coil on the charging device 200 with a center point of a lower coil on the electronic device 100.

Figure 9:
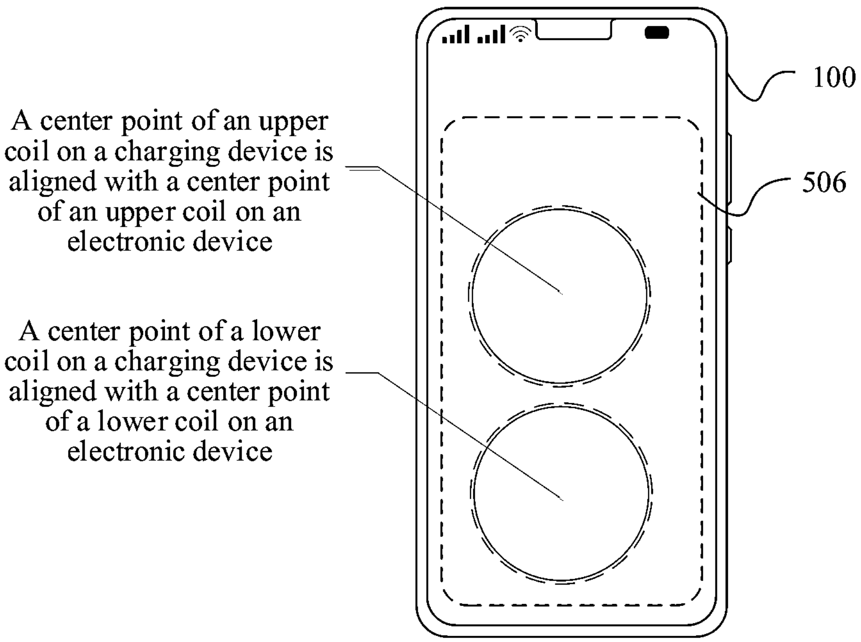
FIG. 9 is a schematic diagram of a fourth scenario according to an embodiment of this application.

In a fourth scenario, referring to FIG. 9, the electronic device 100 is a dual coil and the charging device 200 is also a dual coil. The center point alignment mentioned above refers to alignment of the center point of the upper coil on the charging device 200 with the center point of the upper coil on the electronic device 100 and alignment of the center point of the lower coil on the charging device 200 with the center point of the lower coil on the electronic device 100 (referring to FIG. 8). Alternatively, the center point of the upper coil on the charging device 200 is aligned with the center point of the lower coil on the electronic device 100 and the center point of the lower coil on the charging device 200 is aligned with the center point of the upper coil on the electronic device 100.

Wireless charging performed between the charging device 200 and the electronic device 100 is applicable to a wireless charging standard QI protocol. A wireless charging process is specified in the QI protocol, including: a Ping phase, a recognition phase, a configuration phase, and a power transmission phase. In the power transmission phase, the electronic device 100 periodically sends a control error packet to the charging device 200, the control error packet carrying a difference between a receiving power and an actually required power of the electronic device 100, so that the charging device 200 may adjust a transmitting power according to the control error packet.

When the center point of the transmitting coil on the charging device 200 is aligned with the center point of the receiving coil on the electronic device 100, maximum power transmission efficiency is achieved, that is, the charging device 200 achieves the maximum charging efficiency. Therefore, when performing the process of the QI protocol, the electronic device 100 may perform the coil alignment method provided in this embodiment of this application within an interval between sending two adjacent control error packets in the power transmission phase, to align the center point of the transmitting coil on the charging device 200 with the center point of the receiving coil on the electronic device 100, thereby improving the charging efficiency of the charging device 200.

Embodiment 1

A specific implementation process of coil alignment when the electronic device 100 is the single coil and the charging device 200 is the dual coil is described below by using the second scenario as an example.

Figure 10:
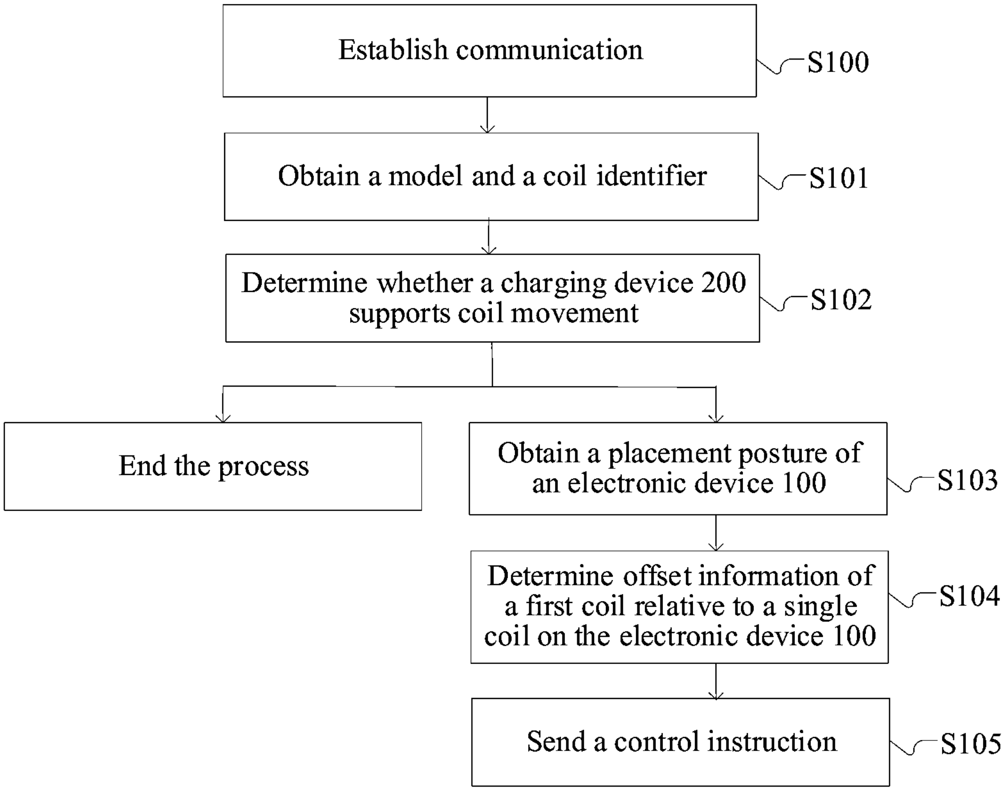
FIG. 10 is a flowchart 1 according to an embodiment of this application.

FIG. 10 is a flowchart 1 according to an embodiment of this application. The specific implementation process of coil alignment in the second scenario includes the following steps.

S100. An electronic device 100 establishes communication with a charging device 200.

Specifically, the charging device 200 transmits Ping pulse energy in a polling manner by using an upper coil and a lower coil. When a user holds the electronic device 100 to approach the charging device 200, and a distance between a single coil on the electronic device 100 and a transmitting coil on the charging device 200 is less than a preset value, the single coil on the electronic device 100 can receive the Ping pulse energy transmitted by the transmitting coil. In this case, the electronic device 100 may determine that the electronic device 100 can communicate with the charging device 200, which may alternatively be referred to as that the electronic device 100 and the charging device 200 are Pinged.

It should be noted that it is merely an example that the charging device 200 transmits the Ping pulse energy in the polling manner by using the upper coil and the lower coil. In another embodiment, the charging device 200 may alternatively simultaneously transmit the Ping pulse energy by using the upper coil and the lower coil. This is not limited in this embodiment of this application.

S101. The electronic device 100 obtains device information of the charging device 200, where the device information includes a model of the charging device 200 and a coil identifier of a coil that establishes communication with the electronic device 100 on the charging device 200.

For ease of description, in this embodiment of this application, the coil that establishes communication with the electronic device 100 on the charging device 200 is referred to as a first transmitting coil, and the coil that establishes communication with the first transmitting coil on the electronic device 100 is referred to as a first receiving coil.

In a possible implementation, the electronic device 100 may send a parameter report request to the charging device 200. After receiving the parameter report request, the charging device 200 sends a model of the charging device 200 and an identifier of a coil that establishes communication with the electronic device 100 on the charging device 200 to the electronic device 100.

S102. The electronic device 100 determines, according to the model of the charging device 200, whether the charging device 200 supports coil movement.

If it is determined that the charging device 200 supports the coil movement, S103 is performed. If it is determined that the charging device 200 does not support the coil movement, the process is ended.

It should be noted that in S101, the electronic device 100 obtains both the model of the charging device 200 and the coil identifier, which is merely an example. In another embodiment. In S101, the electronic device 100 may obtain only the model of the charging device 200, and then obtain the coil identifier when it is determined that the charging device 200 supports the coil movement in S102. This is not limited in this embodiment of this application.

S103. The electronic device 100 obtains a placement posture of the electronic device 100.

In a possible implementation, the electronic device 100 may calculate a posture parameter according to measured values of a direction sensor 115, a magnetometer 116, an accelerometer 117, and a gyroscope 118, and determine a placement posture of the electronic device 100 according to the posture parameter. Specifically, if a value of the posture parameter is in an interval [0, 10], it may be determined that the placement posture of the electronic device 100 is vertical placement with a side at which an earpiece hole is located facing upward. If the value of the posture parameter is in an interval [−10, 0], it may be determined that the placement posture of the electronic device 100 is vertical placement with the side at which the earpiece hole is located facing downward. If the value of the posture parameter is in an interval [50, 80], it may be determined that the placement posture of the electronic device 100 is horizontal placement with a side at which a Power key is located facing upward. If the value of the posture parameter is in an interval [−80, −50], it may be determined that the placement posture of the electronic device 100 is horizontal placement with the side at which the Power key is located facing downward. For ease of description, in this embodiment of this application, the side at which the earpiece hole is located is referred to as a first side, a side opposite to the first side is referred to as a second side, the side at which the Power key is located is referred to as a third side, and a side opposite to the third side is referred to as a fourth side.

It should be noted that division of sides of the electronic device 100 by using the earpiece hole and the Power key is merely an example. In another embodiment, the earpiece hole and the Power key may not be arranged on the sides. In this case, the sides of the electronic device 100 may be divided in another manner. This is not limited in this embodiment of this application.

S104. The electronic device 100 obtains offset information of a first transmitting coil relative to a single coil on the electronic device 100.

In a possible implementation, the electronic device 100 may determine a first transmitting coil according to the coil identifier, then obtain a distance from a center point of the first transmitting coil to a preset limiting edge and a distance from a center point of a single coil on the electronic device 100 to the preset limiting edge according to the model of the charging device 200, and determine offset information of the first transmitting coil relative to the single coil on the electronic device 100 according to the distance from the center point of the first transmitting coil to the preset limiting edge and the distance from the center point of the single coil on the electronic device 100 to the preset limiting edge. In this embodiment of this application, the distance from the center point of the first transmitting coil to the preset limiting edge is referred to as a first distance, and the distance from the center point of the single coil on the electronic device 100 to the preset limiting edge is referred to as a second distance.

Figure 11:
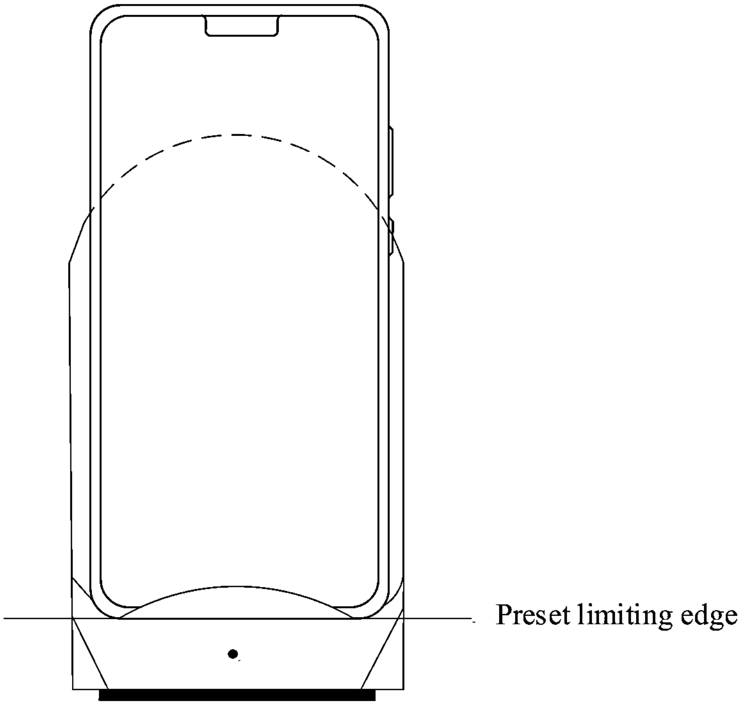
FIG. 11 is a schematic diagram of a preset limiting edge according to an embodiment of this application.

It should be noted that referring to FIG. 11, in this embodiment of this application, the preset limiting edge may be a line where a side at which the electronic device 100 is in contact with the charging device 200 is located after the electronic device 100 is placed on the charging device 200.

In a possible implementation, the electronic device 100 may store coil information corresponding to charging devices 200 of different models. The coil information includes a distance from each center point of transmitting coils on the charging devices 200 to the preset limiting edge. After obtaining the model of the charging device 200 and the coil identifier in S101, the electronic device 100 may query the stored coil information for the distance from the center point of the first transmitting coil to the preset limiting edge according to the model of the charging device 200 and the coil identifier. In addition, the electronic device 100 may obtain the distance from the center point of the single coil on the electronic device 100 to the preset limiting edge according to the placement posture of the electronic device 100. Specifically, when the placement posture of the electronic device 100 is vertical placement with the first side facing upward, a distance from the center point of the single coil on the electronic device 100 to the second side is the distance from the center point of the single coil on the electronic device 100 to the preset limiting edge. When the placement posture of the electronic device 100 is vertical placement with the second side facing upward, a distance from the center point of the single coil on the electronic device 100 to the first side is the distance from the center point of the single coil on the electronic device 100 to the preset limiting edge. When the placement posture of the electronic device 100 is horizontal placement with the third side facing upward, a distance from the center point of the single coil on the electronic device 100 to the fourth side is the distance from the center point of the single coil on the electronic device 100 to the preset limiting edge. When the placement posture of the electronic device 100 is horizontal placement with the fourth side facing upward, a distance from the center point of the single coil on the electronic device 100 to the third side is the distance from the center point of the single coil on the electronic device 100 to the preset limiting edge.

It should be noted that the distance from the center point of the first transmitting coil to the preset limiting edge may also be reported to the electronic device 100 by the charging device 200. Optionally: when reporting the model of the charging device 200 and the coil identifier, the charging device 200 may report the distance from the center point of the first transmitting coil to the preset limiting edge to the electronic device 100 together.

In a possible implementation, after the distance from the center point of the first transmitting coil to the preset limiting edge and the distance from the center point of the single coil on the electronic device 100 to the preset limiting edge are obtained, the distance from the center point of the single coil on the electronic device 100 to the preset limiting edge is subtracted from the distance from the center point of the first transmitting coil to the preset limiting edge, to obtain a result of a subtraction operation. A positive or negative value of the result of the subtraction operation represents an offset direction of the first transmitting coil relative to the single coil on the electronic device 100. Specifically, if the result of the subtraction operation is a positive value, it indicates that the first transmitting coil is offset upward relative to the single coil on the electronic device 100. If the result of the subtraction operation is a negative value, it indicates that the first transmitting coil is offset downward relative to the single coil on the electronic device 100. A value of the result of the subtraction operation indicates an offset distance of the first transmitting coil relative to the single coil on the electronic device 100.

It should be noted that the manner of calculating offset information is merely an example. Alternatively, the distance from the center point of the first transmitting coil to the preset limiting edge may be subtracted from the distance from the center point of the single coil on the electronic device 100 to the preset limiting edge. In this case, an offset direction reflected by a positive or negative value of a result of a subtraction operation is opposite to the foregoing. That is, if the result of the subtraction operation is a positive value, it indicates that the first transmitting coil is offset downward relative to the single coil on the electronic device 100, and if the result of the subtraction operation is a negative value, it indicates that the first transmitting coil is offset upward relative to the single coil on the electronic device 100. In this embodiment of this application, the solution of this embodiment of this application is described by using an example in which the distance from the center point of the single coil on the electronic device 100 to the preset limiting edge is subtracted from the distance from the center point of the first transmitting coil to the preset limiting edge and the result of the subtraction operation is a positive value.

The following gives descriptions by using examples.

Figure 12:
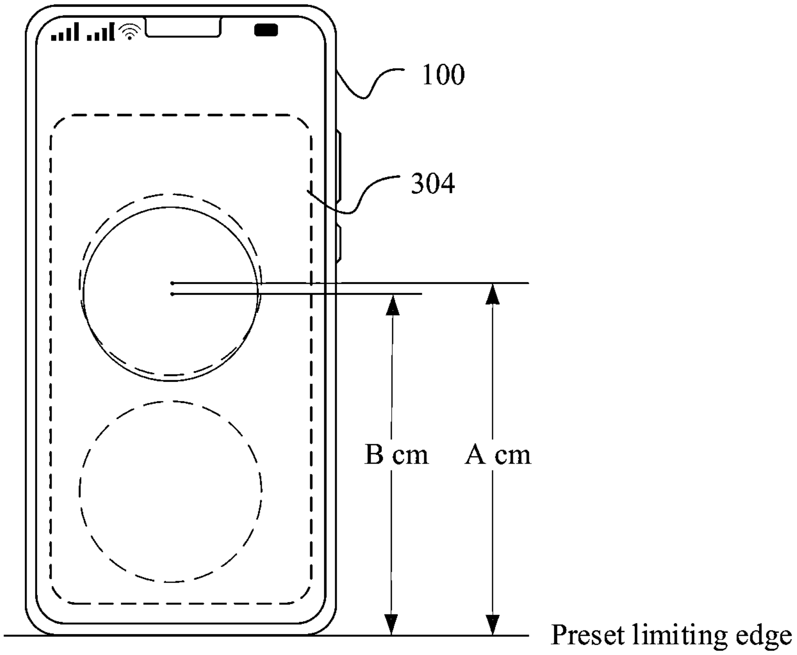
FIG. 12 is a schematic diagram 1 of coil alignment in a second scenario according to an embodiment of this application.

Example 1: Referring to FIG. 12, it is assumed that the model of the charging device 200 obtained in S101 is a model A. and the coil identifier indicates that the coil that establishes communication with the electronic device 100 on the charging device 200 is an upper coil, that is, the upper coil is the first transmitting coil. The placement posture of the electronic device 100 obtained in S103 is vertical placement with the first side facing upward. It is assumed that a queried distance from a center point of the upper coil on the charging device 200 of the model A to the preset limiting edge is A cm. Because the placement posture of the electronic device 100 is vertical placement with the first side facing upward, a distance from the center point of the single coil on the electronic device 100 to the second side is the distance from the center point of the single coil on the electronic device 100 to the preset limiting edge. It is assumed that the distance from the center point of the single coil on the electronic device 100 to the second side is B cm. B cm is subtracted from A cm. Assuming that a result is a positive value, as shown in FIG. 12, it may be determined that the center point of the upper coil on the charging device 200 is offset upward relative to the center point of the single coil on the electronic device 100, and an offset distance is |A cm-B cm|.

Figure 13:
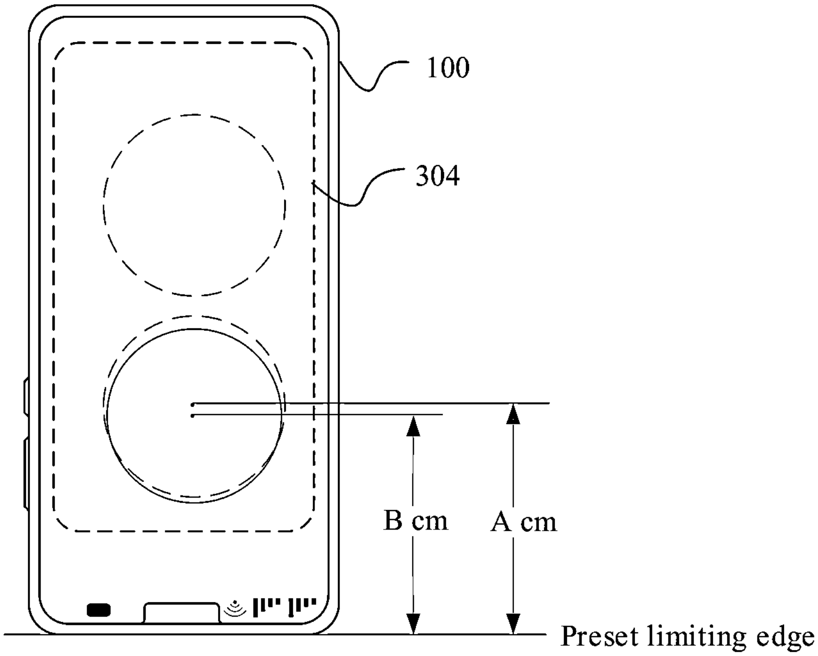
FIG. 13 is a schematic diagram 2 of coil alignment in a second scenario according to an embodiment of this application.

Example 2: Referring to FIG. 13, it is assumed that the model of the charging device 200 obtained in S101 is a model A. and the coil identifier indicates that the coil that establishes communication with the electronic device 100 on the charging device 200 is a lower coil, that is, the lower coil is the first transmitting coil. The placement posture of the electronic device 100 obtained in S103 is vertical placement with the second side facing upward. It is assumed that a queried distance from a center point of the lower coil on the charging device 200 of the model A to the preset limiting edge is A cm. Because the placement posture of the electronic device 100 is vertical placement with the second side facing upward, a distance from the center point of the single coil on the electronic device 100 to the first side is the distance from the center point of the single coil on the electronic device 100 to the preset limiting edge. It is assumed that the distance from the center point of the single coil on the electronic device 100 to the first side is B cm. B cm is subtracted from A cm. Assuming that a result is a positive value, as shown in FIG. 13, it may be determined that the center point of the lower coil on the charging device 200 is offset upward relative to the center point of the single coil on the electronic device 100, and an offset distance is |A cm-B cm|.

Figure 14:
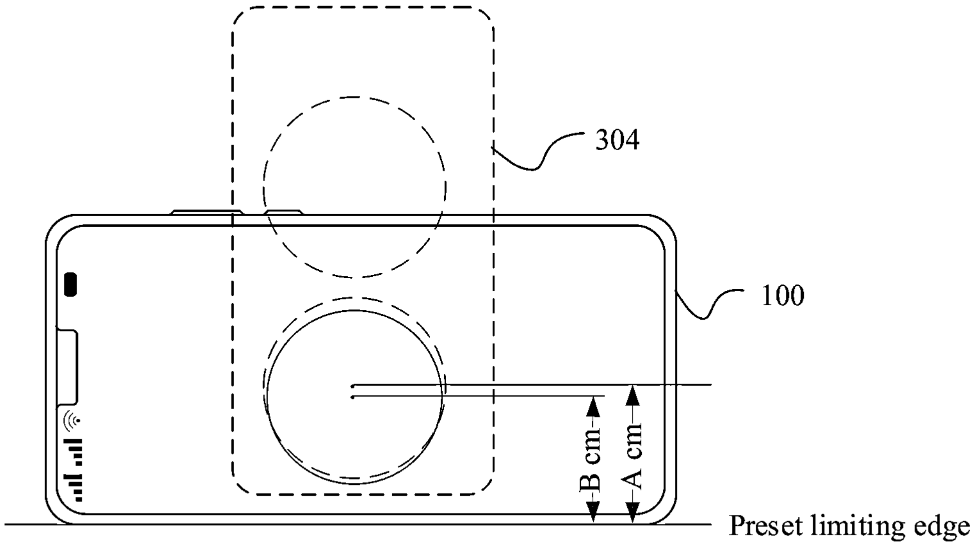
FIG. 14 is a schematic diagram 3 of coil alignment in a second scenario according to an embodiment of this application.

Example 3: Referring to FIG. 14, it is assumed that the model of the charging device 200 obtained in S101 is a model A. and the coil identifier indicates that the coil that establishes communication with the electronic device 100 on the charging device 200 is a lower coil, that is, the lower coil is the first transmitting coil. The placement posture of the electronic device 100 obtained in S103 is horizontal placement with the third side facing upward. It is assumed that a queried distance from a center point of the lower coil on the charging device 200 of the model A to the preset limiting edge is A cm. Because the placement posture of the electronic device 100 is horizontal placement with the third side facing upward, a distance from the center point of the single coil on the electronic device 100 to the fourth side is the distance from the center point of the single coil on the electronic device 100 to the preset limiting edge. It is assumed that the distance from the center point of the single coil on the electronic device 100 to the fourth side is B cm. B cm is subtracted from A cm. Assuming that a result is a positive value, as shown in FIG. 14, it may be determined that the center point of the lower coil on the charging device 200 is offset upward relative to the center point of the single coil on the electronic device 100, and an offset distance is |A cm-B cm|.

Figure 15:
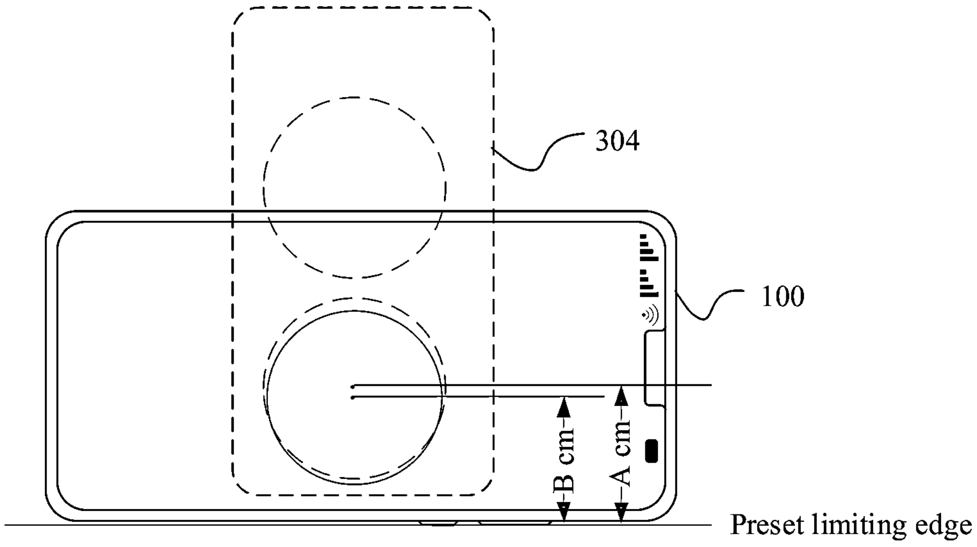
FIG. 15 is a schematic diagram 4 of coil alignment in a second scenario according to an embodiment of this application.

Example 4: Referring to FIG. 15, it is assumed that the model of the charging device 200 obtained in S101 is a model A. and the coil identifier indicates that the coil that establishes communication with the electronic device 100 on the charging device 200 is a lower coil, that is, the lower coil is the first transmitting coil. The placement posture of the electronic device 100 obtained in S103 is horizontal placement with the fourth side facing upward. It is assumed that a queried distance from a center point of the lower coil on the charging device 200 of the model A to the preset limiting edge is A cm. Because the placement posture of the electronic device 100 is horizontal placement with the fourth side facing upward, a distance from the center point of the single coil on the electronic device 100 to the third side is the distance from the center point of the single coil on the electronic device 100 to the preset limiting edge. It is assumed that the distance from the center point of the single coil on the electronic device 100 to the third side is B cm. B cm is subtracted from A cm. Assuming that a result is a positive value, as shown in FIG. 15, it may be determined that the center point of the lower coil on the charging device 200 is offset upward relative to the center point of the single coil on the electronic device 100, and an offset distance is |A cm-B cm|.

S105. The electronic device 100 sends a control instruction to the charging device 200.

The control instruction includes offset information of the first transmitting coil relative to the single coil on the electronic device 100. The offset information includes an offset direction and an offset distance of the first transmitting coil relative to the single coil on the electronic device 100. Therefore, the charging device 200 may control the bottom plate to move upward and downward according to the offset information.

Specifically, in this embodiment of this application, the charging device 200 adopts the structure shown in FIG. 3A to FIG. 3C, which corresponds to the example in FIG. 12, the offset direction is upward offset, and the offset distance is |A cm-B cm|. After receiving the control instruction, the charging device 200 controls the bottom plate 304 to move downward by |A cm-B cm|, to align the center point of the upper coil on the charging device 200 with the center point of the single coil on the electronic device 100.

Examples of FIG. 13 and FIG. 14 are similar to that of FIG. 15, the offset direction is upward offset, and the offset distance is |A cm-B cm|. After receiving the control instruction, the charging device 200 controls the bottom plate 304 to move downward by |A cm-B cm|, to align the center point of the lower coil on the charging device 200 with the center point of the single coil on the electronic device 100.

It should be noted that the upper coil and the lower coil in the structure shown in FIG. 3A to FIG. 3C are fixed to the same bottom plate. When the bottom plate 304 moves, the first transmitting coil moves, and another coil also moves. In another embodiment, the upper coil and the lower coil may be respectively fixed to different bottom plates. After receiving the control instruction, the charging device 200 controls only a bottom plate corresponding to the first transmitting coil to move.

In this embodiment of this application. S100 may be performed in the Ping phase, and S101 to S105 may be performed within an interval between sending two adjacent control error packets in the power transmission phase.

According to the coil alignment method provided in this embodiment of this application, when an electronic device is a single coil and a charging device is a dual coil, the electronic device obtains offset information of a first transmitting coil relative to the single coil on the electronic device and sends a control instruction to the charging device, the control instruction carrying the offset information, so that after the charging device receives the control instruction, at least one coil on the charging device may be moved according to the offset information, to align a center point of the first transmitting coil with a center point of the single coil on the electronic device, thereby improving the charging efficiency of the charging device.

It should be noted that for the first scenario, because the charging device 200 is the single coil, the coil that establishes communication with the electronic device 100 on the charging device 200 may be only the single coil. Therefore, after the electronic device 100 establishes communication with the charging device 200, the electronic device 100 may obtain only a model of the charging device 200. After obtaining the model of the charging device 200, the electronic device 100 determines whether the charging device 200 supports coil movement and obtains a placement posture of the electronic device 100 by using a positioning sensor if the charging device supports the coil movement. Subsequently, a distance from the single coil on the charging device 200 to the preset limiting edge is queried according to the model of the charging device 200. A distance from the single coil on the electronic device 100 to the preset limiting edge is determined according to the placement posture of the electronic device 100. Offset information of the single coil on the charging device 200 relative to the single coil on the electronic device 100 is determined based on the two distances. The electronic device 100 further sends a control instruction to the charging device 200, the control instruction carrying the offset information, so that after the charging device 200 receives the control instruction, the bottom plate on the charging device 200 may be moved according to the offset information, to align a center point of the single coil on the charging device 200 with a center point of the single coil on the electronic device 100. For a detailed implementation process, reference may be made to the implementation process in the second scenario. Details are not described again in this embodiment of this application.

It should be noted that for the third scenario, because the charging device 200 is the single coil, the coil that establishes communication with the electronic device 100 on the charging device 200 may be only the single coil. Therefore, after any coil on the electronic device 100 establishes communication with the single coil on the charging device 200, the electronic device 100 obtains only a model of the charging device 200, determines, according to the model of the charging device 200, whether the charging device 200 supports coil movement, determines whether an upper coil or a lower coil on the electronic device 100 establishes communication with the charging device 200 if the charging device supports the coil movement, obtains offset information of the single coil on the charging device 200 relative to the upper coil on the electronic device 100 according to the placement posture of the electronic device 100 if the upper coil on the electronic device 100 establishes communication with the charging device 200, and sends a control instruction to the charging device 200, the control instruction carrying the offset information, so that after receiving the control instruction, the charging device 200 controls the bottom plate to move upward and downward, to align a center point of the single coil on the charging device 200 with a center point of the upper coil on the electronic device 100. If the lower coil on the electronic device 100 establishes communication with the charging device 200, the electronic device obtains offset information of the single coil on the charging device 200 relative to the lower coil on the electronic device 100 according to the placement posture of the electronic device 100, and sends a control instruction to the charging device 200, the control instruction carrying the offset information, so that after receiving the control instruction, the charging device 200 controls the bottom plate to move upward and downward, to align a center point of the single coil on the charging device 200 with a center point of the lower coil on the electronic device 100. For a detailed implementation process, reference may be made to the implementation process in the second scenario. Details are not described again in this embodiment of this application.

Embodiment 2

The following describes a specific implementation process of coil alignment when the electronic device 100 is a dual coil and the charging device 200 is also a dual coil in the fourth scenario. In this embodiment of this application, a distance between two receiving coils on the electronic device 100 is the same as a distance between two transmitting coils on the charging device 200. The charging device 200 adopts the structure shown in FIG. 5A to FIG. 5C.

Figure 16:
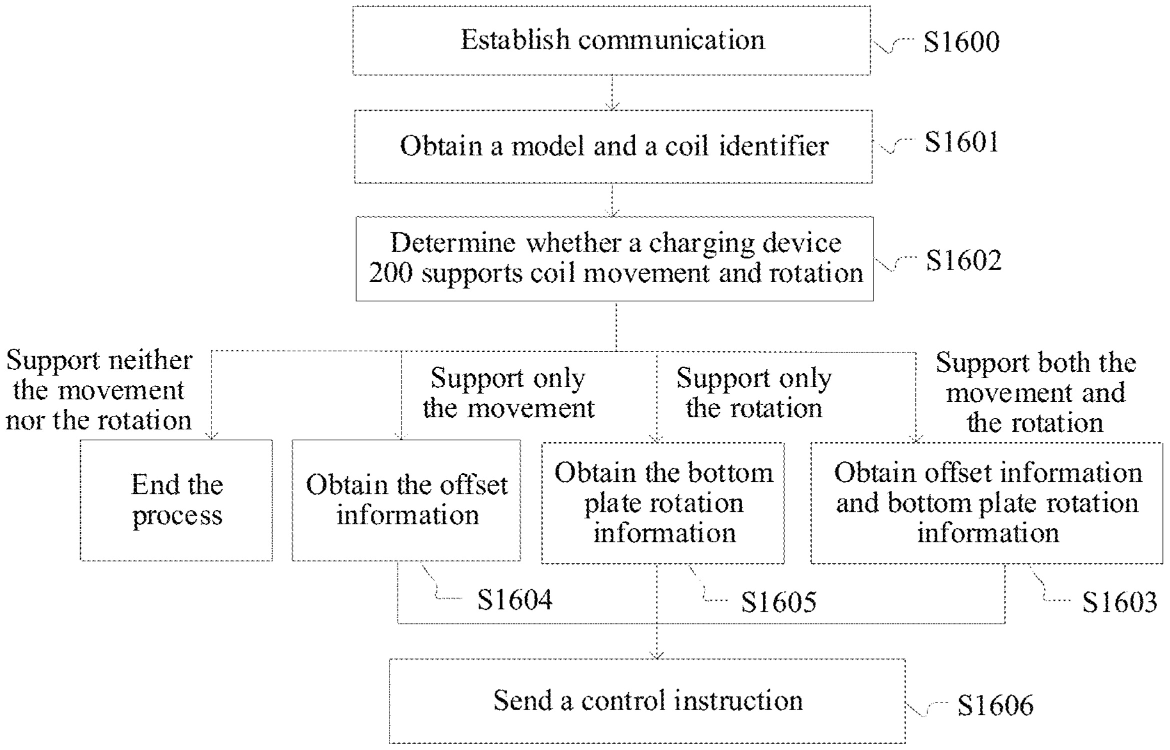
FIG. 16 is a flowchart 2 according to an embodiment of this application.

FIG. 16 is a flowchart 2 according to an embodiment of this application. The specific implementation process of coil alignment in the fourth scenario includes the following steps.

S1600. An electronic device 100 establishes communication with a charging device 200.

Specifically; the charging device 200 transmits Ping pulse energy in a polling manner by using an upper coil and a lower coil. When a user holds the electronic device 100 to approach the charging device 200, and at least one receiving coil on the electronic device 100 can receive the Ping pulse energy, the electronic device 100 may determine that the electronic device 100 can communicate with the charging device 200, which may alternatively be referred to as that the electronic device 100 and the charging device 200 are Pinged.

It should be noted that it is merely an example that the charging device 200 transmits the Ping pulse energy in the polling manner by using the upper coil and the lower coil. In another embodiment, the charging device 200 may alternatively simultaneously transmit the Ping pulse energy by using the upper coil and the lower coil. This is not limited in this embodiment of this application.

S1601. The electronic device 100 obtains device information of the charging device 200, where the device information includes a model of the charging device 200 and a coil identifier of a coil that establishes communication with the electronic device 100 on the charging device 200.

For ease of description, in this embodiment of this application, the coil that establishes communication with the electronic device 100 on the charging device 200 is referred to as a first transmitting coil, and the coil that establishes communication with the first transmitting coil on the electronic device 100 is referred to as a first receiving coil.

Same as the foregoing embodiments, the electronic device 100 may send a parameter report request to the charging device 200. After receiving the parameter report request, the charging device 200 sends the model of the charging device 200 and the coil identifier of the coil that establishes communication with the electronic device 100 on the charging device 200 to the electronic device 100.

S1602. The electronic device 100 determines, according to the model of the charging device 200, whether the charging device 200 supports coil movement and coil rotation.

If the charging device 200 supports neither the coil movement nor the coil rotation, the process is ended.

If the charging device 200 supports the coil movement and the coil rotation, S1603 is performed.

If the charging device 200 supports only the coil movement, S1604 is performed.

If the charging device 200 supports only the coil rotation, S1605 is performed.

S1603. Obtain offset information and bottom plate rotation information.

Figure 17:
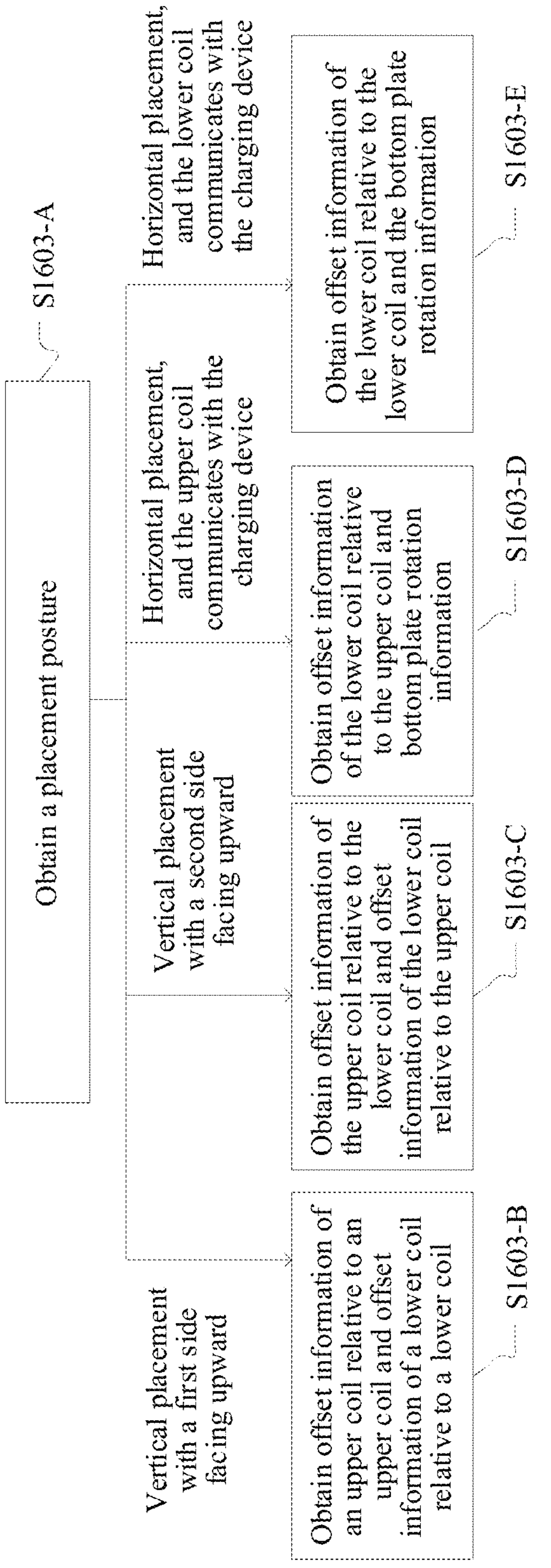
FIG. 17 is a flowchart of obtaining offset information and bottom plate rotation information according to an embodiment of this application.

In a possible implementation, the offset information and the bottom plate rotation information may be obtained in the following manner, referring to FIG. 17, which specifically includes the following steps.

S1603-A. The electronic device 100 obtains a placement posture of the electronic device 100.

For an implementation in which the electronic device 100 obtains the placement posture of the electronic device 100, reference may be made to S103 in the foregoing embodiment. Details are not described again in this embodiment of this application.

If the coil identifier indicates that both the upper coil and the lower coil on the charging device 200 establish communication with the electronic device 100, it indicates that the first transmitting coil includes the upper coil and the lower coil, and correspondingly: the first receiving coil includes an upper coil and a lower coil. If the placement posture of the electronic device 100 is vertical placement with the first side facing upward, it indicates that the electronic device 100 is vertically placed upright, and S1603-B is performed. If the placement posture of the electronic device 100 is vertical placement with the second side facing upward, it indicates that the electronic device 100 is vertically placed upside down, and S1603-C is performed.

If the coil identifier indicates that only the lower coil on the charging device 200 establishes communication with the electronic device 100, it indicates that the first transmitting coil is a lower coil. If the placement posture of the electronic device 100 is horizontal placement, it is further determined whether an upper coil or a lower coil on the electronic device 100 establishes communication with the charging device 200. If the upper coil on the electronic device 100 establishes communication with the charging device 200, that is, the first receiving coil is the upper coil. S1603-D is performed. If the lower coil on the electronic device 100 establishes communication with the charging device 200, that is, the first receiving coil is the lower coil. S1603-E is performed.

S1603-B. Obtain offset information of an upper coil on the charging device 200 relative to an upper coil on the electronic device 100 and offset information of a lower coil on the charging device 200 relative to a lower coil on the electronic device 100.

Because the distance between the two receiving coils on the electronic device 100 is the same as the distance between the two transmitting coils on the charging device 200, the offset information of the upper coil on the charging device 200 relative to the upper coil on the electronic device 100 is the same as the offset information of the lower coil on the charging device 200 relative to the lower coil on the electronic device 100. Therefore, only the offset information of the upper coil on the charging device 200 relative to the upper coil on the electronic device 100 is calculated or only the offset information of the lower coil on the charging device 200 relative to the lower coil on the electronic device 100 is calculated.

An example in which the offset information of the upper coil on the charging device 200 relative to the upper coil on the electronic device 100 is calculated is used.

In a possible implementation, the electronic device 100 may obtain the distance from the center point of the upper coil on the charging device 200 to the preset limiting edge and the distance from the center point of the upper coil on the electronic device 100 to the preset limiting edge, and determine the offset information of the upper coil on the charging device 200 relative to the upper coil on the electronic device 100 according to the two distances.

In a possible implementation, the electronic device 100 may store coil information corresponding to charging devices 200 of different models. The coil information includes a distance from each center point of transmitting coils on the charging devices 200 to the preset limiting edge. After obtaining the model of the charging device 200 in S1601, the electronic device 100 may query for the distance from the center point of the upper coil on the charging device 200 to the preset limiting edge according to the model of the charging device 200. In addition, because the placement posture of the electronic device 100 is vertical placement with the first side facing upward, a distance from the center point of the upper coil on the electronic device 100 to the second side is the distance from the center point of the upper coil on the electronic device 100 to the preset limiting edge.

Same as the foregoing embodiments, the manner of pre-storing the coil information is merely an example. The distance from the center point of the upper coil on the charging device 200 to the preset limiting edge may also be reported by the charging device 200 to the electronic device 100.

In a possible implementation, after the distance from the center point of the upper coil on the charging device 200 to the preset limiting edge and the distance from the center point of the upper coil on the electronic device 100 to the preset limiting edge are obtained, the distance from the center point of the upper coil on the electronic device 100 to the preset limiting edge is subtracted from the distance from the center point of the upper coil on the charging device 200 to the preset limiting edge, to obtain a result of a subtraction operation. A positive or negative value of the result of the subtraction operation represents an offset direction of the upper coil on the charging device 200 relative to the upper coil on the electronic device 100. Specifically, if the result of the subtraction operation is a positive value, it indicates that the upper coil on the charging device 200 is offset upward relative to the upper coil on the electronic device 100. If the result of the subtraction operation is a negative value, it indicates that the upper coil on the charging device 200 is offset downward relative to the upper coil on the electronic device 100. A value of the result of the subtraction operation indicates an offset distance of the upper coil on the charging device 200 relative to the upper coil on the electronic device 100.

It should be noted that the manner of calculating offset information is merely an example. Alternatively, the distance from the center point of the upper coil on the charging device 200 to the preset limiting edge may be subtracted from the distance from the center point of the upper coil on the electronic device 100 to the preset limiting edge. In this case, an offset direction reflected by a positive or negative value of a result of a subtraction operation is opposite to the foregoing. That is, if the result of the subtraction operation is a positive value, it indicates that the upper coil on the charging device 200 is offset downward relative to the upper coil on the electronic device 100, and if the result of the subtraction operation is a negative value, it indicates that the upper coil on the charging device 200 is offset upward relative to the upper coil on the electronic device 100. In this embodiment of this application, the solution of this embodiment of this application is described by using an example in which the distance from the center point of the upper coil on the electronic device 100 to the preset limiting edge is subtracted from the distance from the center point of the upper coil on the charging device 200 to the preset limiting edge and the result of the subtraction operation is a positive value.

The following gives descriptions by using examples.

Figure 18:
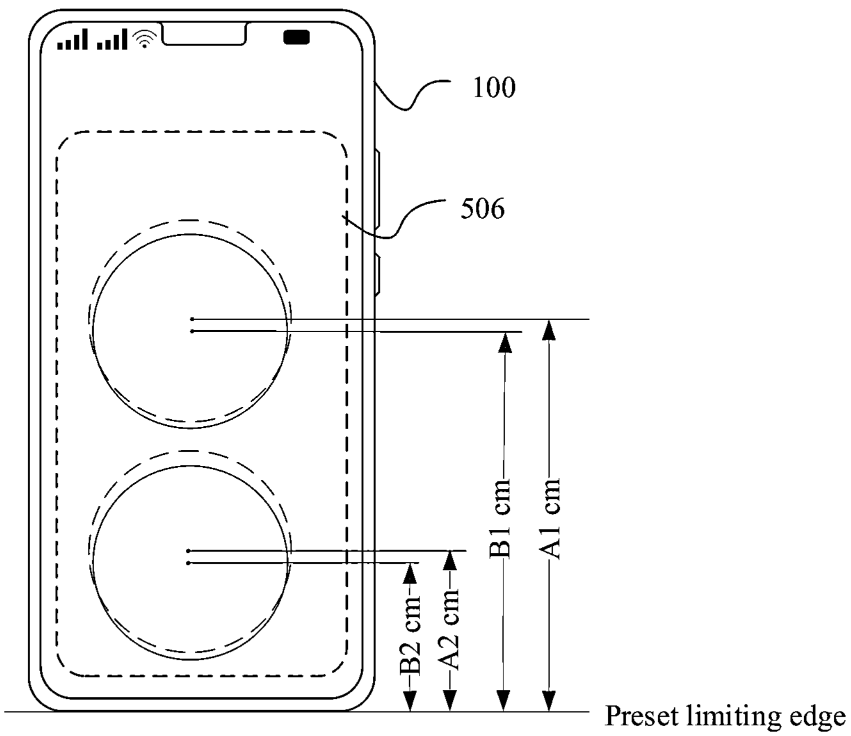
FIG. 18 is a schematic diagram 1 of coil alignment in a fourth scenario according to an embodiment of this application.

Referring to FIG. 18, it is assumed that the model of the charging device 200 obtained in S1601 is a model A, the coil identifier indicates that both the upper coil and the lower coil on the charging device 200 establish communication with the electronic device 100, and the placement posture of the electronic device 100 obtained in S1603 is vertical placement with the first side facing upward. It is queried that a distance from a center point of an upper coil on the charging device 200 of the model A to the preset limiting edge is A1 cm. Because the placement posture of the electronic device 100 is vertical placement with the first side facing upward, a distance from the center point of the upper coil on the electronic device 100 to the second side is the distance from the center point of the upper coil on the electronic device 100 to the preset limiting edge. It is assumed that the distance from the center point of the upper coil on the electronic device 100 to the second side is B1 cm. B1 cm is subtracted from A1 cm. Assuming that a result is a positive value, as shown in FIG. 18, it may be determined that the center point of the upper coil on the charging device 200 is offset upward relative to the center point of the upper coil on the electronic device 100, and an offset distance is |A1 cm-B1 cm|. Because the distance between the two receiving coils on the electronic device 100 is the same as the distance between the two transmitting coils on the charging device 200, offset information of the two transmitting coils relative to the corresponding receiving coils is the same, that is, the center point of the lower coil on the charging device 200 is also offset upward relative to the center point of the lower coil on the electronic device 100, and an offset distance is |A2 cm-B2 cm|, which is equal to |A1 cm-B1 cm|.

S1603-C. Obtain offset information of the upper coil on the charging device 200 relative to the lower coil on the electronic device 100 and offset information of the lower coil on the charging device 200 relative to the upper coil on the electronic device 100.

An implementation of S1603-C is similar to that of S1603-B, which may be obtained through simple inference. Details are not described again in this embodiment of this application.

The following gives descriptions by using examples.

Figure 19:
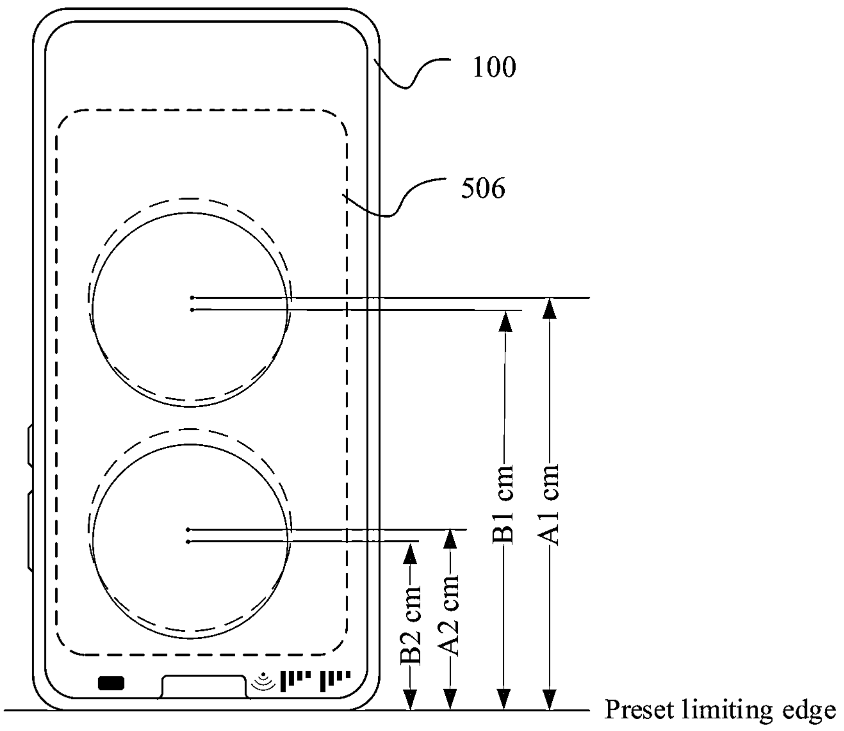
FIG. 19 is a schematic diagram 2 of coil alignment in a fourth scenario according to an embodiment of this application.

Referring to FIG. 19, it is assumed that the model of the charging device 200 obtained in S1601 is a model A, the coil identifier indicates that both the upper coil and the lower coil on the charging device 200 establish communication with the electronic device 100, and the placement posture of the electronic device 100 obtained in S1603 is vertical placement with the second side facing upward. It is queried that a distance from a center point of an upper coil on the charging device 200 of the model A to the preset limiting edge is A1 cm. Because the placement posture of the electronic device 100 is vertical placement with the second side facing upward, a distance from the center point of the lower coil on the electronic device 100 to the first side is the distance from the center point of the lower coil on the electronic device 100 to the preset limiting edge. It is assumed that the distance from the center point of the lower coil on the electronic device 100 to the second side is B1 cm. B1 cm is subtracted from A1 cm. Assuming that a result is a positive value, as shown in FIG. 19, it may be determined that the center point of the upper coil on the charging device 200 is offset upward relative to the center point of the lower coil on the electronic device 100, and an offset distance is |A1 cm-B1 cm|. Because the distance between the two receiving coils on the electronic device 100 is the same as the distance between the two transmitting coils on the charging device 200, offset information of the two transmitting coils relative to the corresponding receiving coils is the same, that is, the center point of the lower coil on the charging device 200 is also offset upward relative to the center point of the upper coil on the electronic device 100, and an offset distance is |A2 cm-B2 cm|, which is equal to |A1 cm-B1 cm|.

S1603-D. Obtain offset information of the lower coil on the charging device 200 relative to the upper coil on the electronic device 100 and the bottom plate rotation information.

An implementation in which the electronic device 100 obtains the offset information of the lower coil on the charging device 200 relative to the upper coil on the electronic device 100 is similar to that of S1603-B, which may be obtained through simple inference. Details are not described again in this embodiment of this application.

In addition, a bottom plate rotation direction may be determined according to the placement posture of the electronic device 100. Specifically, because the upper coil on the electronic device 100 establishes communication with the charging device 200, if the placement posture of the electronic device 100 is horizontal placement with the third side facing upward, the lower coil on the electronic device 100 is on the right of the upper coil, and it may be determined that the bottom plate rotation direction is clockwise. If the placement posture of the electronic device 100 is horizontal placement with the fourth side facing upward, the lower coil on the electronic device 100 is on the left of the upper coil, and it may be determined that the bottom plate rotation direction is counterclockwise.

The following gives descriptions by using examples.

Figure 20:
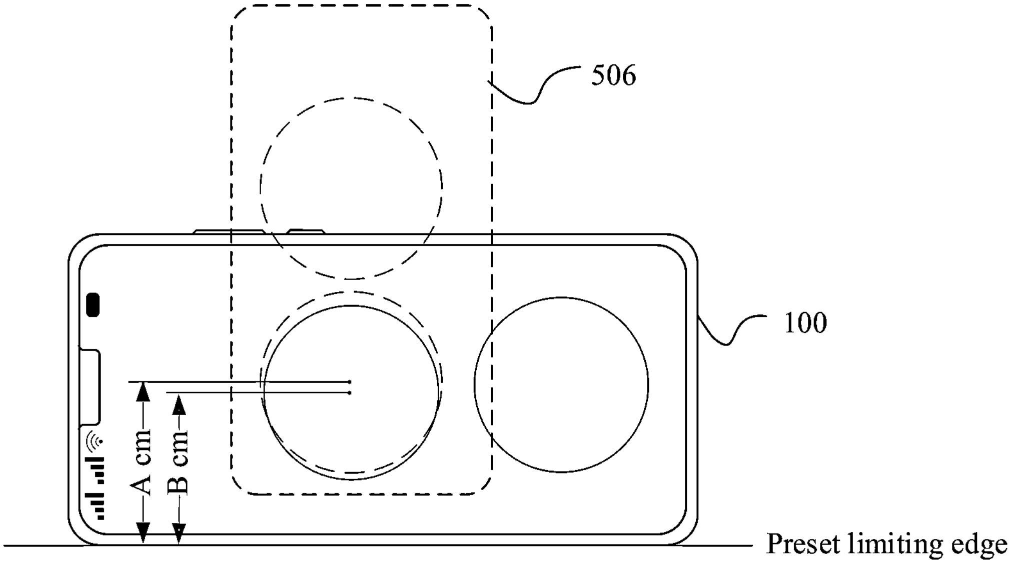
FIG. 20 is a schematic diagram 3 of coil alignment in a fourth scenario according to an embodiment of this application.

Example 1: Referring to FIG. 20, it is assumed that the model of the charging device 200 obtained in S1601 is a model A, the coil identifier indicates that the upper coil on the electronic device 100 establishes communication with the charging device 200, and the placement posture of the electronic device 100 obtained in S1603 is horizontal placement with the third side facing upward. It is queried that a distance from a center point of a lower coil on the charging device 200 of the model A to the preset limiting edge is A cm. Because the placement posture of the electronic device 100 is horizontal placement with the third side facing upward, a distance from the center point of the upper coil on the electronic device 100 to the fourth side is the distance from the center point of the upper coil on the electronic device 100 to the preset limiting edge. It is assumed that the distance from the center point of the upper coil on the electronic device 100 and the fourth side is B cm. B cm is subtracted from A cm. Assuming that a result is a positive value, as shown in FIG. 20, it may be determined that the center point of the lower coil on the charging device 200 is offset upward relative to the center point of the upper coil on the electronic device 100, and an offset distance is |A1 cm-B1 cm|. Because the placement posture of the electronic device 100 is horizontal placement with the third side facing upward, the lower coil on the electronic device 100 is on the right of the upper coil, and it may be determined that the bottom plate rotation direction is clockwise.

Figure 21:
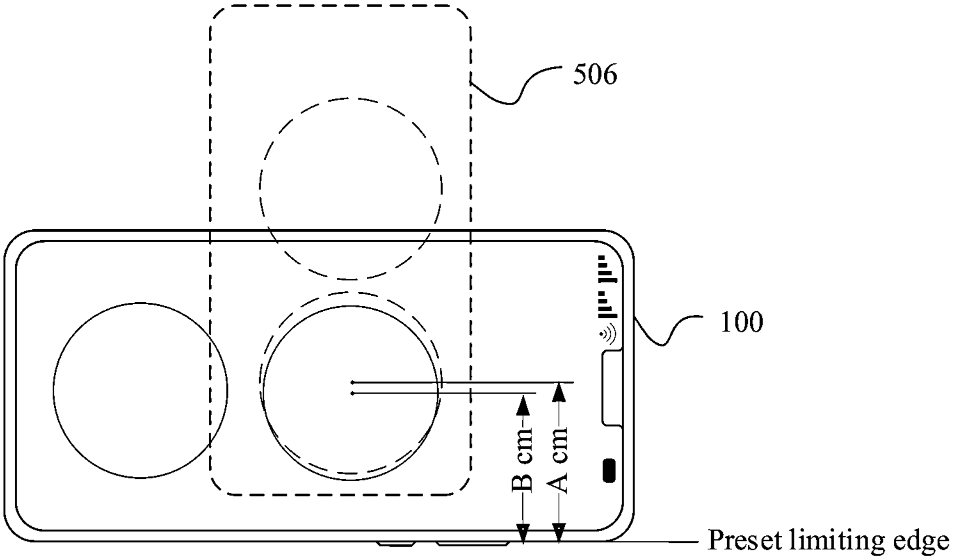
FIG. 21 is a schematic diagram 4 of coil alignment in a fourth scenario according to an embodiment of this application.

Example 2: Referring to FIG. 21, it is assumed that the model of the charging device 200 obtained in S1601 is a model A, the coil identifier indicates that the upper coil on the electronic device 100 establishes communication with the charging device 200, and the placement posture of the electronic device 100 obtained in S1603 is horizontal placement with the fourth side facing upward. It is queried that a distance from a center point of a lower coil on the charging device 200 of the model A to the preset limiting edge is A cm. Because the placement posture of the electronic device 100 is horizontal placement with the fourth side facing upward, a distance from the center point of the upper coil on the electronic device 100 to the third side is the distance from the center point of the upper coil on the electronic device 100 to the preset limiting edge. It is assumed that the distance from the center point of the upper coil on the electronic device 100 to the third side is B cm, B cm is subtracted from A cm. Assuming that a result is a positive value, as shown in FIG. 21, it may be determined that the center point of the lower coil on the charging device 200 is offset upward relative to the center point of the upper coil on the electronic device 100, and an offset distance is |A1 cm-B1 cm|. Because the placement posture of the electronic device 100 is horizontal placement with the fourth side facing upward, the lower coil on the electronic device 100 is on the left of the upper coil, and it may be determined that the bottom plate rotation direction is counterclockwise.

S1603-E. Obtain offset information of the lower coil on the charging device 200 relative to the lower coil on the electronic device 100 and the bottom plate rotation information.

An implementation in which the electronic device 100 obtains the offset information of the lower coil on the charging device 200 relative to the lower coil on the electronic device 100 is similar to that of S1603-B, which may be obtained through simple inference. Details are not described again in this embodiment of this application.

The bottom plate rotation direction may be determined according to the placement posture of the electronic device 100. Specifically, because the lower coil on the electronic device 100 establishes communication with the charging device 200, if the placement posture of the electronic device 100 is horizontal placement with the third side facing upward, the lower coil on the electronic device 100 is on the left of the upper coil, and it may be determined that the bottom plate rotation direction is counterclockwise. If the placement posture of the electronic device 100 is horizontal placement with the fourth side facing upward, the lower coil on the electronic device 100 is on the right of the upper coil, and it may be determined that the bottom plate rotation direction is clockwise.

The bottom plate rotation information includes the bottom plate rotation direction or includes the bottom plate rotation direction and a bottom plate rotation angle. The bottom plate rotation angle may be 90°.

The following gives descriptions by using examples.

Figure 22:
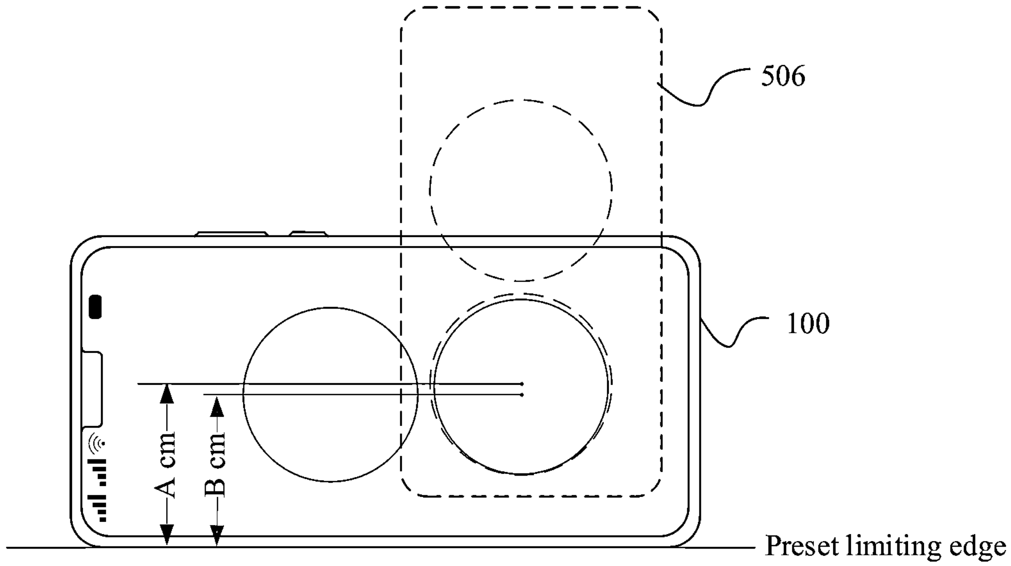
FIG. 22 is a schematic diagram 5 of coil alignment in a fourth scenario according to an embodiment of this application.

Example 1: Referring to FIG. 22, it is assumed that the model of the charging device 200 obtained in S1601 is a model A, the coil identifier indicates that the lower coil on the electronic device 100 establishes communication with the charging device 200, and the placement posture of the electronic device 100 obtained in S1603 is horizontal placement with the third side facing upward. It is queried that a distance from a center point of a lower coil on the charging device 200 of the model A to the preset limiting edge is A cm. Because the placement posture of the electronic device 100 is horizontal placement with the third side facing upward, a distance from the center point of the lower coil on the electronic device 100 to the fourth side is the distance from the center point of the lower coil on the electronic device 100 to the preset limiting edge. It is assumed that the distance from the center point of the lower coil on the electronic device 100 to the fourth side is B cm, B cm is subtracted from A cm. Assuming that a result is a positive value, as shown in FIG. 22, it may be determined that the center point of the lower coil on the charging device 200 is offset upward relative to the center point of the lower coil on the electronic device 100, and an offset distance is |A1 cm-B1 cm|. Because the placement posture of the electronic device 100 is horizontal placement with the third side facing upward, the lower coil on the electronic device 100 is on the left of the upper coil, and it may be determined that the bottom plate rotation direction is counterclockwise.

Figure 23:
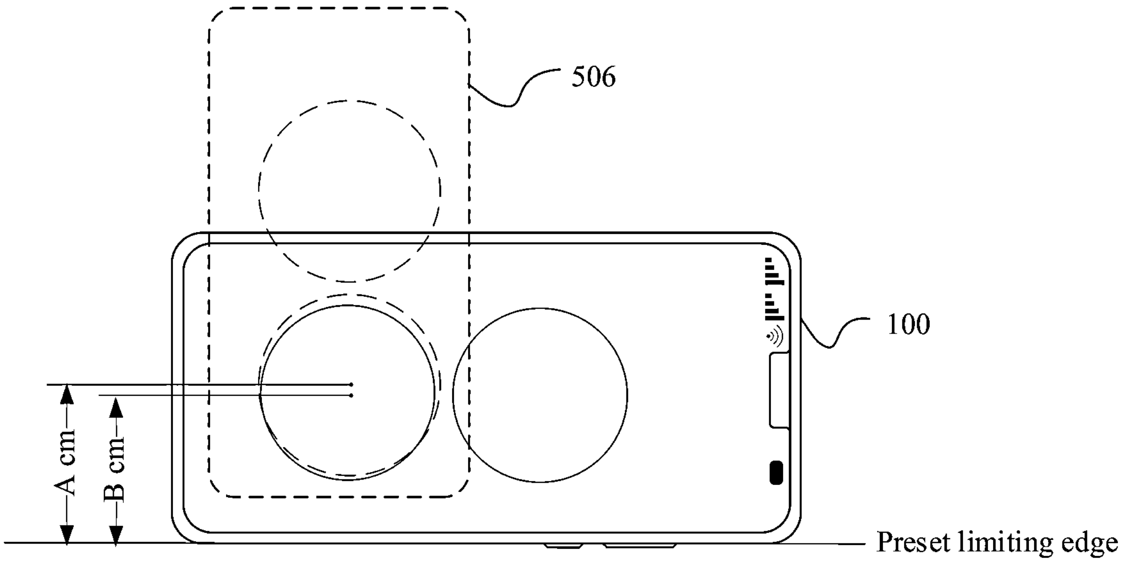
FIG. 23 is a schematic diagram 6 of coil alignment in a fourth scenario according to an embodiment of this application.

Example 2: Referring to FIG. 23, it is assumed that the model of the charging device 200 obtained in S1601 is a model A, the coil identifier indicates that the lower coil on the electronic device 100 establishes communication with the charging device 200, and the placement posture of the electronic device 100 obtained in S1603 is horizontal placement with the fourth side facing upward. It is queried that a distance from a center point of a lower coil on the charging device 200 of the model A to the preset limiting edge is A cm. Because the placement posture of the electronic device 100 is horizontal placement with the fourth side facing upward, a distance from the center point of the lower coil on the electronic device 100 to the third side is the distance from the center point of the lower coil on the electronic device 100 to the preset limiting edge. It is assumed that the distance from the center point of the lower coil on the electronic device 100 to the third side is B cm, B cm is subtracted from A cm. Assuming that a result is a positive value, as shown in FIG. 23, it may be determined that the center point of the lower coil on the charging device 200 is offset upward relative to the center point of the lower coil on the electronic device 100, and an offset distance is |A1 cm-B1 cm|. Because the placement posture of the electronic device 100 is horizontal placement with the fourth side facing upward, the lower coil on the electronic device 100 is on the right of the upper coil, and it may be determined that the bottom plate rotation direction is clockwise.

S1604. Obtain the offset information.

Figure 24:
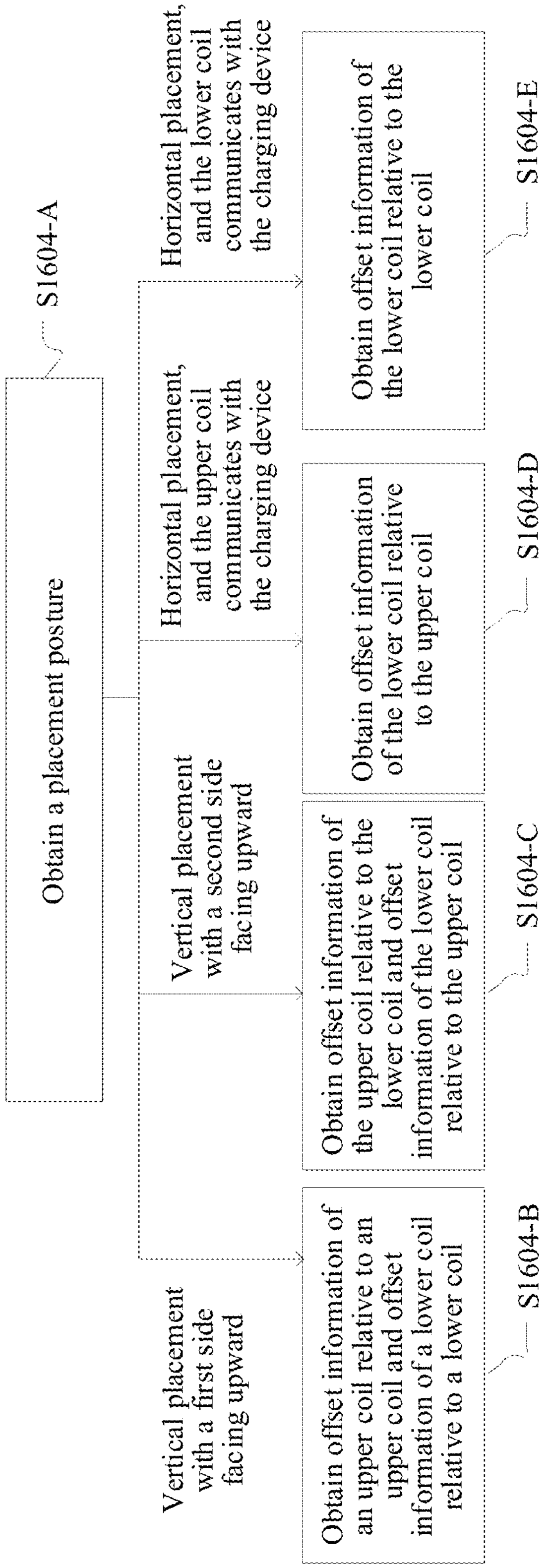
FIG. 24 is a flowchart of obtaining offset information according to an embodiment of this application.

In a possible implementation, the offset information may be obtained in the following manner, referring to FIG. 24, which specifically includes the following steps.

S1604-A. The electronic device 100 obtains a placement posture of the electronic device 100.

For an implementation in which the electronic device 100 obtains the placement posture of the electronic device 100, reference may be made to S103 in the foregoing embodiment. Details are not described again in this embodiment of this application.

If the coil identifier indicates that both the upper coil and the lower coil on the charging device 200 establish communication with the electronic device 100, and the placement posture of the electronic device 100 is vertical placement with the first side facing upward, it indicates that the electronic device 100 is vertically placed upright, and S1604-B is performed.

If the coil identifier indicates that both the upper coil and the lower coil on the charging device 200 establish communication with the electronic device 100, and the placement posture of the electronic device 100 is vertical placement with the second side facing upward, it indicates that the electronic device 100 is vertically placed upside down, and S1604-C is performed.

If the coil identifier indicates that only the lower coil on the charging device 200 establishes communication with the electronic device 100, and the placement posture of the electronic device 100 is horizontal placement, it is further determined whether an upper coil or a lower coil on the electronic device 100 establishes communication with the charging device 200. If the upper coil on the electronic device 100 establishes communication with the charging device 200, S1604-D is performed. If the lower coil on the electronic device 100 establishes communication with the charging device 200, S1604-E is performed.

S1604-B. Obtain offset information of an upper coil on the charging device 200 relative to an upper coil on the electronic device 100 and offset information of a lower coil on the charging device 200 relative to a lower coil on the electronic device 100.

S1604-C. Obtain offset information of the upper coil on the charging device 200 relative to the lower coil on the electronic device 100 and offset information of the lower coil on the charging device 200 relative to the upper coil on the electronic device 100.

S1604-D. Obtain offset information of the lower coil on the charging device 200 relative to the upper coil on the electronic device 100.

S1604-E. Obtain offset information of the lower coil on the charging device 200 relative to the lower coil on the electronic device 100.

Implementation processes of S1604-B, S1604-C, S1604-D, and S1604-E are similar to that of S1603-B, which may be obtained through simple inference. Details are not described again in this embodiment of this application.

S1605. Obtain the bottom plate rotation information.

Figure 25:
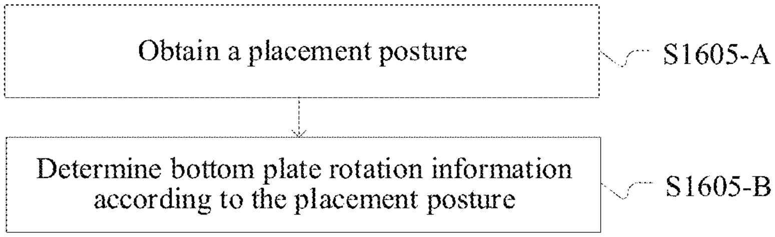
FIG. 25 is a flowchart of obtaining bottom plate rotation information according to an embodiment of this application.

In a possible implementation, the bottom plate rotation information may be obtained in the following manner, referring to FIG. 25, which specifically includes the following steps.

S1605-A. The electronic device 100 obtains a placement posture of the electronic device 100.

For an implementation in which the electronic device 100 obtains the placement posture of the electronic device 100, reference may be made to S103 in the foregoing embodiment. Details are not described again in this embodiment of this application.

S1605-B. The electronic device 100 determines the bottom plate rotation information according to the placement posture of the electronic device 100.

If the placement posture of the electronic device 100 is vertical placement, the charging device 200 does not need to rotate the bottom plate, and the process is directly ended.

If the placement posture of the electronic device 100 is horizontal placement, it is further determined whether the upper coil or the lower coil on the electronic device 100 establishes communication with the charging device 200.

If the upper coil on the electronic device 100 establishes communication with the charging device 200, and the third side of the electronic device 100 is facing upward, the lower coil on the electronic device 100 is on the right of the upper coil thereof, and it may be determined that the bottom plate rotation direction is clockwise. If the upper coil on the electronic device 100 establishes communication with the charging device 200, and the fourth side of the electronic device 100 is facing upward, the lower coil on the electronic device 100 is on the left of the upper coil thereof, and it may be determined that the bottom plate rotation direction is counterclockwise. For a specific implementation, reference may be made to S1603-D in the foregoing embodiment. Details are not described again in this embodiment of this application.

If the lower coil on the electronic device 100 establishes communication with the charging device 200, and the third side of the electronic device 100 is facing upward, the lower coil on the electronic device 100 is on the left of the upper coil thereof, and it may be determined that the bottom plate rotation direction is counterclockwise. If the lower coil on the electronic device 100 establishes communication with the charging device 200, and the fourth side of the electronic device 100 is facing upward, the lower coil on the electronic device 100 is on the right of the upper coil thereof, and it may be determined that the bottom plate rotation direction is clockwise. For a specific implementation, reference may be made to S1603-E in the foregoing embodiment. Details are not described again in this embodiment of this application.

S1606. The electronic device 100 sends a control instruction to the charging device 200.

In a case that the charging device 200 supports both the coil movement and the coil rotation, if the step performed by the electronic device 100 is S1603-B, the control instruction carries the offset information of the upper coil on the charging device 200 relative to the upper coil on the electronic device 100 and the offset information of the lower coil on the charging device 200 relative to the lower coil on the electronic device 100.

After receiving the control instruction, the charging device 200 controls the bottom plate 506 to move according to the offset information of the upper coil on the charging device 200 relative to the upper coil on the electronic device 100 and the offset information of the lower coil on the charging device 200 relative to the lower coil on the electronic device 100.

Corresponding to the example shown in FIG. 18, the upper coil on the charging device 200 is offset upward relative to the upper coil on the electronic device 100, and the offset distance is |A1 cm-B1 cm|. The lower coil on the charging device 200 is also offset upward relative to the lower coil on the electronic device 100, and the offset distance is |A2 cm-B2 cm|. As described above, |A1 cm-B1 cm| is equal to |A2 cm-B2 cm|. After receiving the control instruction, the charging device 200 controls the bottom plate 506 to move downward by |A1 cm-B1 cm|, to align the center point of the upper coil on the charging device 200 with the center point of the upper coil on the electronic device 100, and align the center point of the lower coil on the charging device 200 with the center point of the lower coil on the electronic device 100.

If the step performed by the electronic device 100 is S1603-C, the control instruction carries the offset information of the upper coil on the charging device 200 relative to the lower coil on the electronic device 100 and the offset information of the lower coil on the charging device 200 relative to the upper coil on the electronic device 100.

After receiving the control instruction, the charging device 200 controls the bottom plate 506 to move according to the offset information of the upper coil on the charging device 200 relative to the lower coil on the electronic device 100 and the offset information of the lower coil on the charging device 200 relative to the upper coil on the electronic device 100.

Corresponding to the example shown in FIG. 19, the upper coil on the charging device 200 is offset upward relative to the lower coil on the electronic device 100, and the offset distance is |A1 cm-B1 cm|. The lower coil on the charging device 200 is also offset upward relative to the upper coil on the electronic device 100, and the offset distance is |A2 cm-B2 cm|. As described above. |A1 cm-B1 cm| is equal to |A2 cm-B2 cm|. After receiving the control instruction, the charging device 200 controls the bottom plate 506 to move downward by |A1 cm-B1 cm|, to align the center point of the upper coil on the charging device 200 with the center point of the lower coil on the electronic device 100, and align the center point of the lower coil on the charging device 200 with the center point of the upper coil on the electronic device 100.

It should be noted that in the scenario described above, the distance between the two receiving coils on the electronic device 100 is the same as the distance between the two transmitting coils on the charging device 200. In this case, the offset information of the two transmitting coils relative to the corresponding receiving coils is the same. Therefore, the two transmitting coils can be respectively aligned with the corresponding receiving coils by moving the bottom plate 506. In another embodiment, the distance between the two receiving coils on the electronic device 100 is different from the distance between the two transmitting coils on the charging device 200. In this case, the offset information of the two transmitting coils relative to the corresponding receiving coils is different, and the two transmitting coils cannot be respectively aligned with the corresponding receiving coils by moving the bottom plate 506. In this scenario, charging devices 200 of different structures may be adopted, for example, the upper coil and the lower coil are respectively fixed to charging devices 200 on different bottom plates. Therefore, after receiving the control instruction, the charging devices 200 control corresponding bottom plates to move according to the offset information of the two transmitting coils.

If the step performed by the electronic device 100 is S1603-D, the control instruction carries the offset information of the lower coil on the charging device 200 relative to the upper coil on the electronic device 100 and the bottom plate rotation information.

After receiving the control instruction, the charging device 200 moves the bottom plate 506 according to the offset information of the lower coil on the charging device 200 relative to the upper coil on the electronic device 100, and rotates the bottom plate 506 according to the bottom plate rotation information.

Corresponding to the example shown in FIG. 20, the lower coil on the charging device 200 is offset upward relative to the upper coil on the electronic device 100, the offset distance is |A cm-B cm|, and the bottom plate rotation direction is clockwise. After receiving the control instruction, the charging device 200 may control the bottom plate 506 to move downward by |A cm-B cm|, to align the center point of the lower coil on the charging device 200 with the center point of the upper coil on the electronic device 100. In addition, the charging device controls the bottom plate 506 to rotate clockwise by 90°. Because the distance between the two receiving coils on the electronic device 100 is the same as the distance between the two transmitting coils on the charging device 200, the center point of the upper coil on the charging device 200 can also be aligned with the center point of the lower coil on the electronic device 100 after rotation.

Corresponding to the example shown in FIG. 21, the lower coil on the charging device 200 is offset upward relative to the upper coil on the electronic device 100, the offset distance is |A cm-B cm|, and the bottom plate rotation direction is counterclockwise. After receiving the control instruction, the charging device 200 may control the bottom plate 506 to move downward by |A cm-B cm|, to align the center point of the lower coil on the charging device 200 with the center point of the upper coil on the electronic device 100. In addition, the charging device controls the bottom plate 506 to rotate counterclockwise by 90°. Because the distance between the two receiving coils on the electronic device 100 is the same as the distance between the two transmitting coils on the charging device 200, the center point of the upper coil on the charging device 200 can also be aligned with the center point of the lower coil on the electronic device 100 after rotation.

If the step performed by the electronic device 100 is S1603-E, the control instruction carries the offset information of the lower coil on the charging device 200 relative to the lower coil on the electronic device 100 and the bottom plate rotation information.

After receiving the control instruction, the charging device 200 moves the bottom plate 506 according to the offset information of the lower coil on the charging device 200 relative to the lower coil on the electronic device 100, and rotates the bottom plate 506 according to the bottom plate rotation information.

Corresponding to the example shown in FIG. 22, the lower coil on the charging device 200 is offset upward relative to the lower coil on the electronic device 100, the offset distance is |A cm-B cm|, and the bottom plate rotation direction is counterclockwise. After receiving the control instruction, the charging device 200 may control the bottom plate 506 to move downward by |A cm-B cm|, to align the center point of the lower coil on the charging device 200 with the center point of the lower coil on the electronic device 100. In addition, the charging device controls the bottom plate 506 to rotate counterclockwise by 90°. Because the distance between the two receiving coils on the electronic device 100 is the same as the distance between the two transmitting coils on the charging device 200, the center point of the upper coil on the charging device 200 can also be aligned with the center point of the upper coil on the electronic device 100 after rotation.

Corresponding to the example shown in FIG. 23, the lower coil on the charging device 200 is offset upward relative to the lower coil on the electronic device 100, the offset distance is |A cm-B cm|, the bottom plate rotation direction is clockwise. After receiving the control instruction, the charging device 200 may control the bottom plate 506 to move downward by |A cm-B cm|, to align the center point of the lower coil on the charging device 200 with the center point of the lower coil on the electronic device 100. In addition, the charging device controls the bottom plate 506 to rotate clockwise by 90°. Because the distance between the two receiving coils on the electronic device 100 is the same as the distance between the two transmitting coils on the charging device 200, the center point of the upper coil on the charging device 200 can also be aligned with the center point of the upper coil on the electronic device 100 after rotation.

It should be noted that the bottom plate rotation angle may be carried in the bottom plate rotation information or may be a default value. This is not limited in this embodiment of this application.

It should be noted that it is merely an example that the bottom plate 506 is first controlled to move and then the bottom plate 506 is controlled to rotate in the foregoing. Alternatively: the bottom plate 506 may be first controlled to rotate according to the bottom plate rotation direction, and then the bottom plate 506 is controlled to move according to the offset information. A sequence is not limited in this embodiment of this application.

In a case that the charging device 200 supports only the coil movement, if the step performed by the electronic device 100 is S1604-B, which is the same as S1603-B, the control instruction carries the offset information of the upper coil on the charging device 200 relative to the upper coil on the electronic device 100 and the offset information of the lower coil on the charging device 200 relative to the lower coil on the electronic device 100.

If the step performed by the electronic device 100 is S1604-C, which is the same as S1603-C, the control instruction carries the offset information of the upper coil on the charging device 200 relative to the lower coil on the electronic device 100 and the offset information of the lower coil on the charging device 200 relative to the upper coil on the electronic device 100.

If the step performed by the electronic device 100 is S1604-D, the control instruction carries the offset information of the lower coil on the charging device 200 relative to the upper coil on the electronic device 100.

If the step performed by the electronic device 100 is S1604-E, the control instruction carries the offset information of the lower coil on the charging device 200 relative to the lower coil on the electronic device 100.

A processing process after the charging device 200 receives the control instruction is similar to that in the foregoing embodiments. Details are not described again in this embodiment of this application.

In a case that the charging device 200 supports only the coil rotation, the control instruction carries the bottom plate rotation information. A processing process after the charging device 200 receives the control instruction is similar to that in the foregoing embodiments. Details are not described again in this embodiment of this application.

According to the coil alignment method provided in this embodiment of this application, when both an electronic device and a charging device are a dual coil, if a coil identifier indicates that only a lower coil on the charging device establishes communication with the electronic device, the electronic device may obtain offset information of the lower coil on the charging device relative to a corresponding receiving coil and bottom plate rotation information and then send a control instruction to the charging device, and after receiving the control instruction, the charging device may move and rotate a bottom plate according to the offset information and the bottom plate rotation information, to respectively align center points of two transmitting coils on the charging device with center points of two receiving coils on the electronic device, thereby improving the charging efficiency.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A coil alignment method, comprising:

obtaining, by an electronic device, coil adjustment information after the electronic device establishes communication with a charging device, wherein the electronic device is configured to be capable of performing wireless charging with the charging device, the electronic device comprises at least one receiving coil, the charging device comprises at least one transmitting coil and a bottom plate, and the at least one transmitting coil is fixed to the bottom plate, the coil adjustment information comprising: coil offset information and bottom plate rotation information, the coil offset information being offset information of a first transmitting coil relative to a first receiving coil, the first transmitting coil being a transmitting coil that establishes communication with the electronic device on the charging device, the first receiving coil being a receiving coil that communicates with the first transmitting coil, and the bottom plate rotation information being rotation information of the bottom plate relative to the electronic device, wherein the at least one transmitting coil comprises an upper coil and a lower coil, the at least one receiving coil comprises an upper coil and a lower coil, and the first transmitting coil is a lower coil;

wherein the coil adjustment information comprises:

obtaining, by the electronic device, a placement posture of the electronic device;

determining, by the electronic device, the bottom plate rotation information according to the placement posture of the electronic device and the first receiving coil; and sending, by the electronic device, a control instruction to the charging device, the control instruction carrying the coil adjustment information, so that the charging device adjusts the transmitting coil on the charging device according to the control instruction.

2. The method according to claim 1, wherein the coil adjustment information comprises the coil offset information, and the obtaining, by the electronic device, coil adjustment information comprises:

obtaining, by the electronic device, a coil identifier of a coil that establishes communication with the electronic device on the charging device;

determining, by the electronic device, the first transmitting coil according to the coil identifier; and determining, by the electronic device, the coil offset information according to the first transmitting coil.

3. The method according to claim 2, wherein the determining, by the electronic device, the coil offset information according to the first transmitting coil comprises:

obtaining, by the electronic device, a first distance, the first distance being a distance from a center point of the first transmitting coil to a preset limiting edge;

obtaining, by the electronic device, a second distance, the second distance being a distance from a center point of the first receiving coil to the preset limiting edge; and determining, by the electronic device, the coil offset information according to the first distance and the second distance.

4. The method according to claim 3, wherein the determining, by the electronic device, the coil offset information according to the first distance and the second distance comprises:

obtaining, by the electronic device, a result of a subtraction operation performed on the first distance and the second distance;

determining, by the electronic device, an offset direction of the first transmitting coil relative to the first receiving coil depending on whether the result of the subtraction operation is a positive or negative value; and determining, by the electronic device, an offset distance of the first transmitting coil relative to the first receiving coil according to a value of the result of the subtraction operation, the coil offset information comprising the offset direction and the offset distance.

5. The method according to claim 3, wherein the obtaining, by the electronic device, a second distance comprises:

obtaining, by the electronic device, a placement posture of the electronic device; and determining, by the electronic device, the second distance according to the placement posture.

6. The method according to claim 5, wherein the determining, by the electronic device, the second distance according to the placement posture comprises:

using, if the placement posture is vertical placement with a first side facing upward, a distance from the center point of the first receiving coil to a second side as the second distance;

using, if the placement posture is vertical placement with the second side facing upward, a distance from the center point of the first receiving coil to the first side as the second distance;

using, if the placement posture is horizontal placement with a third side facing upward, a distance from the center point of the first receiving coil to a fourth side as the second distance; or using, if the placement posture is horizontal placement with the fourth side facing upward, a distance from the center point of the first receiving coil and the third side as the second distance, the first side being a side at which an earpiece hole is located, the second side being a side opposite to the first side, the third side being a side at which a power key is located, and the fourth side being a side opposite to the third side.

7. The method according to claim 1, wherein the first transmitting coil comprises an upper coil and a lower coil, the first receiving coil comprises an upper coil and a lower coil, the coil adjustment information comprises the coil offset information, and the obtaining, by the electronic device, coil adjustment information comprises:

obtaining, by the electronic device, a placement posture of the electronic device;

obtaining, if the placement posture is vertical placement with the first side facing upward, offset information of an upper coil on the charging device relative to an upper coil on the electronic device and offset information of a lower coil on the charging device relative to a lower coil on the electronic device; or obtaining, if the placement posture is vertical placement with the second side facing upward, offset information of the upper coil on the charging device relative to the lower coil on the electronic device and offset information of the lower coil on the charging device relative to the upper coil on the electronic device.

8. The method according to claim 1, wherein the determining, by the electronic device, the bottom plate rotation information according to a placement posture of the electronic device and the first receiving coil comprises:

determining, a bottom plate rotation direction as clockwise if the first receiving coil is an upper coil on the electronic device, and the placement posture is horizontal placement with the third side facing upward;

determining the bottom plate rotation direction as counterclockwise if the first receiving coil is the upper coil on the electronic device, and the placement posture is horizontal placement with the fourth side facing upward;

determining the bottom plate rotation direction as counterclockwise if the first receiving coil is a lower coil on the electronic device, and the placement posture is horizontal placement with the third side facing upward; or determining the bottom plate rotation direction as clockwise if the first receiving coil is the lower coil on the electronic device, and the placement posture is horizontal placement with the fourth side facing upward, the bottom plate rotation information comprising the bottom plate rotation direction.

9. The method according to claim 1, wherein the obtaining, by the electronic device, coil adjustment information comprises:

obtaining, by the electronic device, a model of the charging device;

determining, by the electronic device according to the model, whether the charging device supports coil movement and coil rotation;

obtaining the coil offset information if the charging device supports only the coil movement;

obtaining the bottom plate rotation information if the charging device supports only the coil rotation; or obtaining the coil offset information and the bottom plate rotation information if the charging device supports the coil movement and the coil rotation.

10. An electronic device, comprising: at least one receiving coil, a memory, and a processor, the receiving coil being configured to receive magnetic field energy transmitted by a transmitting coil on a charging device, the memory being configured to store executable instructions, and the executable instructions, when executed by the processor, causing the electronic device to implement the method according to claim 1.

11. A coil alignment method, comprising:

sending, by a charging device, charging device information to an electronic device after the charging device establishes communication with the electronic device, wherein the charging device is configured to be capable of performing wireless charging with the electronic device, the electronic device comprises at least one receiving coil, the charging device comprises at least one transmitting coil and a bottom plate, and the at least one transmitting coil is fixed to the bottom plate, the charging device information being used by the electronic device to obtain coil adjustment information according to the charging device information, the coil adjustment information comprising: coil offset information and bottom plate rotation information, the coil offset information being offset information of a first transmitting coil relative to a first receiving coil, the first transmitting coil being a transmitting coil that establishes communication with the electronic device on the charging device, the first receiving coil being a receiving coil that communicates with the first transmitting coil, and the bottom plate rotation information being rotation information of the bottom plate relative to the electronic device, wherein the at least one transmitting coil comprises an upper coil and a lower coil, the at least one receiving coil comprises an upper coil and a lower coil, and the first transmitting coil is a lower coil, wherein the bottom plate rotation information is determined according to a placement posture of the electronic device and the first receiving coil;

receiving, by the charging device, a control instruction sent by the electronic device, the control instruction carrying the coil adjustment information; and adjusting, by the charging device, the transmitting coil on the charging device according to the control instruction.

12. The method according to claim 11, wherein the charging device information comprises a coil identifier of a coil that establishes communication with the electronic device on the charging device, and the coil identifier is used by the electronic device to determine the first transmitting coil according to the coil identifier and determine the coil offset information according to the first transmitting coil.

13. The method according to claim 11, wherein the charging device information further comprises a model of the charging device, and the model is used by the electronic device to determine, according to the model, whether the charging device supports coil movement and coil rotation, wherein if the charging device supports only the coil movement, the electronic device obtains the coil offset information; if the charging device supports only the coil rotation, the electronic device obtains the bottom plate rotation information; or if the charging device supports the coil movement and the coil rotation, the electronic device obtains the coil offset information and the bottom plate rotation information.

14. A charging device, comprising:

at least one transmitting coil, a bottom plate, a memory, and a processor, the at least one transmitting coil being fixed to the bottom plate, the transmitting coil being configured to transmit magnetic field energy, the memory being configured to store executable instructions, and the executable instructions, when executed by the processor, causing the charging device to:

send charging device information to an electronic device after the charging device establishes communication with the electronic device, wherein the charging device is configured to be capable of performing wireless charging with the electronic device, the electronic device comprises at least one receiving coil, the charging device comprises at least one transmitting coil and a bottom plate, and the at least one transmitting coil is fixed to the bottom plate, the charging device information being used by the electronic device to obtain coil adjustment information according to the charging device information, the coil adjustment information comprising: coil offset information and bottom plate rotation information, the coil offset information being offset information of a first transmitting coil relative to a first receiving coil, the first transmitting coil being a transmitting coil that establishes communication with the electronic device on the charging device, the first receiving coil being a receiving coil that communicates with the first transmitting coil, and the bottom plate rotation information being rotation information of the bottom plate relative to the electronic device, wherein the at least one transmitting coil comprises an upper coil and a lower coil, the at least one receiving coil comprises an upper coil and a lower coil, and the first transmitting coil is a lower coil, wherein the bottom plate rotation information is determined according to a placement posture of the electronic device and the first receiving coil;

receive a control instruction sent by the electronic device, the control instruction carrying the coil adjustment information; and adjust the transmitting coil on the charging device according to the control instruction.

15. The charging device according to claim 14, further comprising: a first driving component, the first driving component being configured to drive the bottom plate to move, and the processor being configured to control, according to a control instruction, the first driving component to work, to move the bottom plate under an action of the first driving component.

16. The charging device according to claim 15, wherein the first driving component comprises: a first motor, a first gear, and a movable component engaged with the first gear, the first gear is mounted on the first motor, the movable component is fixed to the bottom plate, the first gear is configured to rotate under the action of the first motor, and the movable component is configured to move under the drive of the first gear, to move the bottom plate.

17. The charging device according to claim 14, further comprising: a second driving component, the second driving component comprising: a second motor and a second gear, the second gear being fixed to the bottom plate, and the second gear being configured to rotate under an action of the second motor, to rotate the bottom plate.

18. The charging device according to claim 14, wherein the charging device information comprises a coil identifier of a coil that establishes communication with the electronic device on the charging device, and the coil identifier is used by the electronic device to determine the first transmitting coil according to the coil identifier and determine the coil offset information according to the first transmitting coil.

19. The charging device according to claim 14, wherein the charging device information further comprises a model of the charging device, and the model is used by the electronic device to determine, according to the model, whether the charging device supports coil movement and coil rotation, wherein if the charging device supports only the coil movement, the electronic device obtains the coil offset information; if the charging device supports only the coil rotation, the electronic device obtains the bottom plate rotation information; or if the charging device supports the coil movement and the coil rotation, the electronic device obtains the coil offset information and the bottom plate rotation information.

* * * * *